United States Patent
Soler et al.

(10) Patent No.: US 10,420,184 B1
(45) Date of Patent: Sep. 17, 2019

(54) BIO-DIMMING LIGHTING SYSTEM

(71) Applicant: Biological Innovation and Optimization Systems, LLC, Carlsbad, CA (US)

(72) Inventors: Robert Soler, San Marcos, CA (US); Eric Schafer, Carlsbad, CA (US); Abhishek Goyanka, Irving, TX (US)

(73) Assignee: Biological Innovation and Optimization Systems, LLC, Carlsbad, CA (US)

( * ) Notice: Subject to any disclaimer, the term of this patent is extended or adjusted under 35 U.S.C. 154(b) by 0 days.

(21) Appl. No.: 16/257,970

(22) Filed: Jan. 25, 2019

(51) Int. Cl.
*H05B 33/08* (2006.01)
*G06F 3/0484* (2013.01)

(52) U.S. Cl.
CPC ..... *H05B 33/0857* (2013.01); *G06F 3/04847* (2013.01); *H05B 33/0845* (2013.01)

(58) Field of Classification Search
CPC .............. H05B 33/086; H05B 33/0863; H05B 33/0803; H05B 33/0845; H05B 33/0857; H05B 37/02; H05B 37/0272; H05B 37/0281; A61N 5/0618; A61N 2005/0652; A61N 2005/0663; A61N 2005/0626; A61N 2005/0661; A61M 21/00; A61M 2021/0044; Y02B 20/42; F21Y 2115/10
See application file for complete search history.

(56) References Cited

U.S. PATENT DOCUMENTS

| | | | |
|---|---|---|---|
| 6,965,205 B2 * | 11/2005 | Piepgras | H05B 33/0857 315/292 |
| 7,015,636 B2 | 3/2006 | Bolta | |
| 7,256,557 B2 | 8/2007 | Lim et al. | |
| 8,436,556 B2 | 5/2013 | Eisele et al. | |
| 8,876,313 B2 | 11/2014 | Grajcar | |
| 9,313,856 B2 | 4/2016 | Saffari et al. | |
| 9,410,664 B2 | 8/2016 | Krames et al. | |
| 9,788,387 B2 * | 10/2017 | Soler | H05B 33/0866 |
| 9,795,000 B1 | 10/2017 | Sooch et al. | |
| 9,827,439 B2 | 11/2017 | Maxik et al. | |
| 9,924,574 B1 | 3/2018 | Fernandez et al. | |
| 9,936,557 B1 | 4/2018 | Janik et al. | |
| 10,004,122 B1 | 6/2018 | Li et al. | |

(Continued)

FOREIGN PATENT DOCUMENTS

WO 2013162308 A1 10/2013
WO 2016058846 A1 4/2016

*Primary Examiner* — Haissa Philogene
(74) *Attorney, Agent, or Firm* — MLO, a professional corp.

(57) ABSTRACT

Lighting control systems are disclosed that have a lighting fixture, a microprocessor, and a single dimmer control that enables a user to adjust a total current to the lighting fixture. The lighting fixture includes a first LED channel that emits a first spectrum comprising white light and a second LED channel that emits a second spectrum comprising biologically-tailored light. The microprocessor is configured to take measurements of current, store a plurality of average values of total current, set a setpoint that defines a maximum current for a dimming profile of the lighting fixture, and control a biological light ratio according to the dimming profile. The ratio may be an M/P ratio of melanopic lux to photopic lux or an OPN5/OPN4 ratio of OPN5 lux to melanopic lux. The dimming profile correlates the ratio to a percentage of the maximum current.

26 Claims, 12 Drawing Sheets

(56) References Cited

U.S. PATENT DOCUMENTS

| | | | |
|---|---|---|---|
| 10,022,556 B1 | 7/2018 | Holbert et al. | |
| 10,212,766 B2 * | 2/2019 | Gordin | A61N 5/0618 |
| 2004/0052076 A1 | 3/2004 | Mueller et al. | |
| 2013/0320862 A1 | 12/2013 | Campbell et al. | |
| 2014/0306620 A1 | 10/2014 | Maxik et al. | |
| 2015/0327342 A1 | 11/2015 | Lu et al. | |
| 2016/0195227 A1 | 7/2016 | Rooijmans | |
| 2017/0189640 A1 | 7/2017 | Sadwick | |
| 2017/0259079 A1 * | 9/2017 | Grajcar | A61N 5/0618 |
| 2017/0325310 A1 | 11/2017 | Chen et al. | |
| 2017/0348506 A1 | 12/2017 | Berman et al. | |
| 2018/0043130 A1 | 2/2018 | Moore-Ede et al. | |
| 2018/0056027 A1 | 3/2018 | Peeters et al. | |
| 2018/0063930 A1 | 3/2018 | Trice et al. | |
| 2018/0070421 A1 | 3/2018 | Soler et al. | |
| 2018/0073689 A1 | 3/2018 | Soer et al. | |
| 2018/0077767 A1 * | 3/2018 | Soler | H05B 33/0863 |
| 2018/0077783 A1 | 3/2018 | Sooch et al. | |
| 2018/0177017 A1 | 6/2018 | Soler et al. | |
| 2018/0338359 A1 | 11/2018 | Soler | |

* cited by examiner

BIO-DIMMING LIGHTING SYSTEM

BACKGROUND

Light emitting diode (LED) technology is a maturing technology that continues to show improvements in efficiency, customability and cost reduction. LED technology is rapidly being deployed in a host of industries and markets including general lighting for homes, offices, and transportation, solid state display lighting such as in LCDs, aviation, agricultural, medical, and other fields of application. The increased energy efficiency of LED technology compared with other lighting solutions coupled with the reduction of costs of LED themselves are increasing the number of LED applications and rates of adoption across industries. While LED technology promises greater reliability, longer lifetimes and greater efficiencies than other lighting technologies, the ability to mix and independently drive different color LEDs to produce customized and dynamic light output makes LED technology and solid-state lighting (SSL) in general robust platforms to meet the demands of a variety of market needs and opens the door to many new applications of these lighting technologies.

Melanopsin is a type of photopigment belonging to a larger family of light-sensitive retinal proteins called opsins and is found in intrinsically photosensitive retinal ganglion cells (ipRGCs) of humans and other mammals. Melanopsin plays an important non-image-forming role in the photoentrainment of circadian rhythms as well as potentially many other physiologic functions. Stimulation of melanopsin-containing ipRGCs contributes to various reflexive responses of the brain and body to the presence of light. Melanopsin photoreceptors are sensitive to a range of wavelengths and reach peak light absorption at wavelengths around 480-500 (or 490) nanometers (nm). Melanopic light, that is light corresponding to the melanopsin action spectrum, including particularly the wavelengths in the 480-500 nm region, is important for non-visual stimuli including physiological and neurological effects such as pupillary light reflex and circadian entrainment and/or disruption. Time-coordinated exposure, including over-exposure and under-exposure to melanopic light, can be used to entrain and facilitate healthy circadian rhythms in humans and other mammals.

Circadian related photoreceptors are in the macular and peripheral vision regions of the retina. Melanopsin related photoreceptors are most sensitive in the lower hemisphere of the retina. Selective stimulation of these photoreceptors is possible by directing illumination, and specifically melanopic light, towards or away from the region of the retina where melanopic photoreceptors are most concentrated or most sensitive or responsive. If the desire is to optimally stimulate these photoreceptors, then a light source that directs biological light (i.e., melanopic light) onto this region would be a good solution. Equivalent Melanopic Lux (EML) is a metric for measuring the biological effects of light on humans. EML as a metric is weighted to the ipRGCs response to light and translates how much the spectrum of a light source stimulates ipRGCs and affects the circadian system. Melanopic ratio is the ratio of melanopic lux to photopic lux for a given light source.

While it is well known that exposure to light, both natural and artificial, can affect an individual's circadian rhythms, studies also indicate that the natural light of the sky during twilight, that is the short period around dawn or dusk when the sun is near the horizon, may have a significant impact on circadian drive and/or the gating of sleep pressure. Although the sky appears deep blue during twilight, it has significantly less radiant energy in the melanopic region (e.g., 490 nm) and significantly higher radiant energy in the 420 nm region, as compared to the sky during midday.

Scientific data indicates that the suprachiasmatic nucleus contains color representation of the sensed color of light. During the vast majority of the daytime, when the sun is up, the color temperature of the sky is between 5500 K and 7000 K. The only time when this changes is during twilight periods when the sun is low. Common perception suggests that at these times the sky gets redder. However, this is not the case, and while the sun appears redder as its irradiance travels through more of our earth's atmosphere, in fact the sky gets much bluer (e.g., at twilight, the color temperature of the sky may be at 8000-9000 K).

There are two unique and compelling circadian phenomena which coincide with the time when the sky gets bluer. First, sleep inertia, which is the tendency for humans to remain asleep, occurs during sleep. Upon wakening, a circadian-driven surge in blood cortisol levels helps individuals to wake up refreshed by mitigating sleep inertia. This cortisol response has been shown to synergistically occur with presence of light. On the other end of the day, e.g., at sunset, the wake maintenance zone portion of the circadian cycle has been demonstrated as a point of hyper-activity and enhanced neurobiological activity. It is hypothesized that this heightened activity may be an evolutionary survival response to ensure that individuals have sufficient alertness and energy to complete any tasks and find safety prior to the onset of darkness. At the time of day around twilight (or equivalent point in a circadian photoperiod) the human neurophysiology may be affected by specific light cues (that occur only at twilight) with regard to the body's circadian rhythm. For example, one effect may be the initiation of a sleep gating process or conversely the absence or reduction of such gating without exposure to the twilight.

The ability to control the circadian spectra and color temperatures of light during dimming of LED fixtures, such as in response to an environmental cue or to human preference, has been implemented in some systems. For example, systems have been disclosed in which a user can control the amount of circadian stimulation depending on the time of day or based on certain activities such as working late or jet-lag. Existing systems often include individual controllers to adjust the color temperature of the light and overall brightness such as through dimmers. Systems also have included learning modes to understand a user's habits during the day or to learn behavior according to certain activity cues.

SUMMARY

In some embodiments, a lighting control system includes a lighting fixture, a dimmer control and a microprocessor. The lighting fixture has a first LED channel that emits a first spectrum comprising white light and a second LED channel that emits a second spectrum comprising biologically-tailored light. The biologically-tailored light has a first wavelength peak that is in a range from 650 nm to 670 nm and a second wavelength peak that is in a range from 480 nm to 500 nm. The dimmer control is a single control that enables a user to adjust a total current to the lighting fixture. The microprocessor is configured to take measurements of a first current through the first LED channel and a second current through the second LED channel. A sum of the first current and the second current is the total current. The microprocessor is also configured to store a plurality of smallest average values of the total current, each of the smallest average values being calculated from the measurements over a plurality of sampling periods. The microprocessor sets a setpoint based on a largest of the plurality of smallest average values, where the setpoint defines a maximum current for a dimming profile of the lighting fixture. The microprocessor controls a melanopic to photopic ratio (M/P ratio) according to the dimming profile, where the dimming profile correlates the M/P ratio to a percentage of the maximum current. The M/P ratio is a ratio of a melanopic lux to a photopic lux. A maximum M/P ratio is output when the total current is equal to or greater than the setpoint.

In some embodiments, a lighting control system includes a lighting fixture, a dimmer control and a microprocessor. The lighting fixture has a first LED channel that emits 1) a first spectrum comprising white light, 2) a second LED channel that emits a second spectrum comprising biologically-tailored light having a first wavelength peak in a range from 650 nm to 670 nm and a second wavelength peak in a range from 480 nm to 500 nm, and 3) a third LED channel that emits a third spectrum having a third wavelength peak in a range from 370 nm to 410 nm. The dimmer control is a single control that enables a user to adjust a total current to the lighting fixture. The microprocessor is configured to take measurements of a first current through the first LED channel, a second current through the second LED channel, and a third current through the third LED channel. A sum of the first current and the second current and the third current is the total current. The microprocessor sets a setpoint based on a plurality of average values of the total current, where the setpoint defines a maximum current for a dimming profile of the lighting fixture. The microprocessor also is configured to control an OPN5/OPN4 ratio according to the dimming profile, wherein the dimming profile correlates the OPN5/OPN4 ratio to a percentage of the maximum current, where the OPN5/OPN4 ratio is a ratio of an OPN5 lux to a melanopic lux. A minimum OPN5/OPN4 ratio is output when the total current is equal to or greater than the setpoint.

In some embodiments, a lighting control system includes a lighting fixture, a dimmer control and a microprocessor. The lighting fixture has a first LED channel that emits a first spectrum comprising white light and a second LED channel that emits a second spectrum comprising a wavelength peak in a range from 370 nm to 410 nm. The dimmer control is a single control that enables a user to adjust a total current to the lighting fixture. The microprocessor is configured to take measurements of a first current through the first LED channel and a second current through the second LED channel, where a sum of the first current and the second current is the total current. A setpoint is set by the microprocessor based on a plurality of average values of the total current, where the setpoint defines a maximum current for a dimming profile of the lighting fixture. The microprocessor controls an OPN5/OPN4 ratio according to the dimming profile, where the dimming profile correlates the OPN5/OPN4 ratio to a percentage of the maximum current. The OPN5/OPN4 ratio is a ratio of an OPN5 lux to a melanopic lux. A minimum OPN5/OPN4 ratio is output when the total current is equal to or greater than the setpoint.

DETAILED DESCRIPTION

Lighting systems are disclosed that provide biological light using a dimming profile and a maximum output that is tailored to a user's preferences. The maximum output may also be referred to as a maximum setpoint or a setpoint in this disclosure, where the setpoint defines the highest electrical current that will be utilized by LEDs in the lighting system. The system beneficially adjusts the setpoint according to the user's preferences in an easy-to-use and stable manner, allowing periodic adjustments to the light through a single dimmer control without erratically changing the setpoint. The biological light is also improved over conventional systems by incorporating multiple wavelengths that play a role in circadian entrainment and by enabling spatial distributions that further enhance circadian response. For example, the present lighting systems can include biological wavelengths such as one or more of: melanopic light (approximately 490 nm) which targets the photoreceptor OPN4, sub-dermal stimulation light (e.g., approximately 660 nm and greater than approximately 700 nm (far-red)), and violet light (approximately 380 nm) which targets the photoreceptor OPN5 and has been found in recent studies to play a role in circadian entrainment. The dimming profiles change the proportions of biological light as the light is dimmed, such as by changing a ratio of melanopic light to photopic light and/or changing a ratio of OPN5- to OPN4-targeted light. Additionally, the lighting system decreases biological light without compromising the visual light output (e.g., lumen output and/or color temperature) when the light is in a high output range.

Dimming Control

Figure 1:
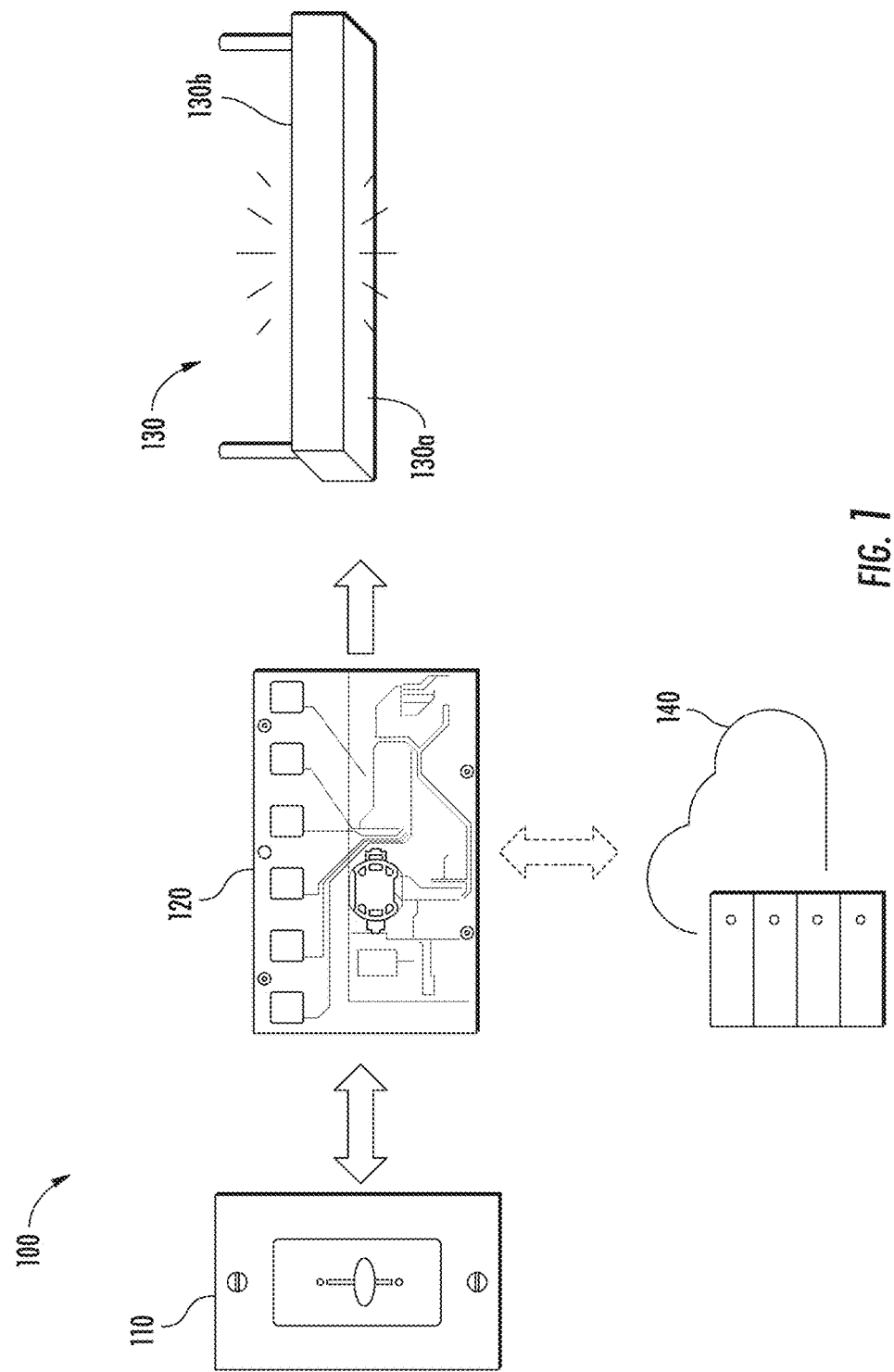
FIG. 1 is a schematic diagram of a lighting control system, in accordance with some embodiments.

FIG. 1 is a schematic diagram of a lighting control system 100, in accordance with some embodiments. Lighting control system 100 includes a dimmer control 110 that interacts with a microprocessor 120 to control the amount of light that is output by a lighting fixture 130. Dimmer control 110 is adjusted by a user and is shown as a slider interface in this embodiment but may be configured in other forms such as, but not limited to, a rotating knob, a pivoting lever or a touch screen, where the touch screen may have any user interface design. The dimmer control 110 may provide continuously adjustable positions or may have stepped increments. Lighting fixture 130 is shown as a multi-directional fixture in this embodiment, having both direct pendant 130a and indirect pendant 130b to provide downlighting and uplighting, respectively. In other embodiments the lighting fixture 130 may be configured to provide only direct or only indirect lighting, and can take any form (e.g., coves, recessed, sconces, pendants). The lighting fixture 130 includes multiple LED modules (not shown) to deliver white light and various wavelengths having biological significance, as shall be described in more detail later in this disclosure. In some embodiments, lighting system 100 can also include a controller 140 in communication with the microprocessor 120, where the controller 140 may be a local computer hardware processor or a cloud-based processing system. The controller 140 may serve as a building automation system and may be used to compute, process, and/or store data from the lighting fixture such as measurements of electrical current in the LEDs, rates of changes, time points at which changes occur, and duration of dimming adjustments. Thus, functions described as being performed by the microprocessor in this disclosure may by performed by the controller as well. In other embodiments, the computation, processing, and storing of data may all be performed locally by the microprocessor 120.

Figure 2:
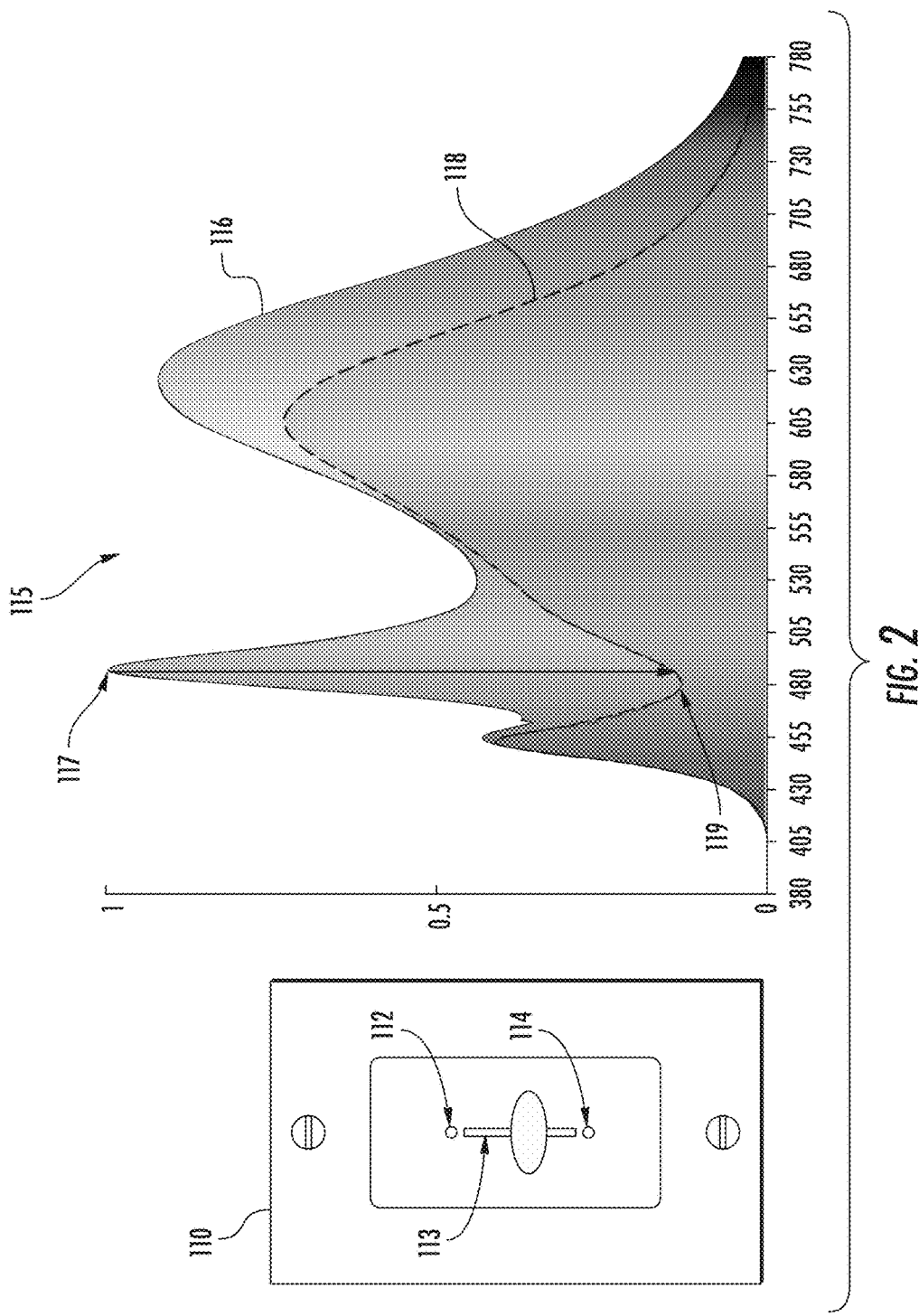
FIG. 2 shows a dimmer control and an associated dimming profile, in accordance with some embodiments.

FIG. 2 is an illustration demonstrating that the dimmer control 110 integrates the adjustability of overall light levels as well as a biological dimming profile of the lighting system 100 into a single control. The lighting system uniquely marries psychology (i.e., user preferences) with biological benefits to deliver an overall dimming profile that provides brighter days and darker nights, as in the natural cycle of sunlight. In the embodiment of a spectral distribution graph 115 shown in FIG. 2, the system delivers a high amount of light in the peak melanopsin sensitivity range during the day and reduces the melanopic light at night. For example, a user may use a high dimmer setting, such as setting 112 of dimmer control 110, to deliver the spectral distribution 116 of graph 115. The spectral distribution 116 contains a high amount of melanopic light as indicated by the peak at approximately 490 nm indicated by point 117. Moving the dimmer control 110 to a lower setting 114 causes the spectral distribution 118 to be delivered, where the amount of melanopic light is greatly reduced to point 119. At the same time, the dimmer control 110 enables a user to adjust the maximum overall light output of the lighting system. The system learns the highest level of light that is comfortable for the user by monitoring the lighting levels and durations that are utilized by the user. For example, if a user frequently maintains the dimmer at a setting 113 that is less than the highest setting 112, the lighting system will define a setpoint with a maximum current corresponding to setting 113. Thus, the present lighting systems and methods beneficially provide dual functions in a single dimming interface—allowing a user to dim levels of biological light as well as automatically adapting to a user's preferences of maximum light levels.

Figure 3A:
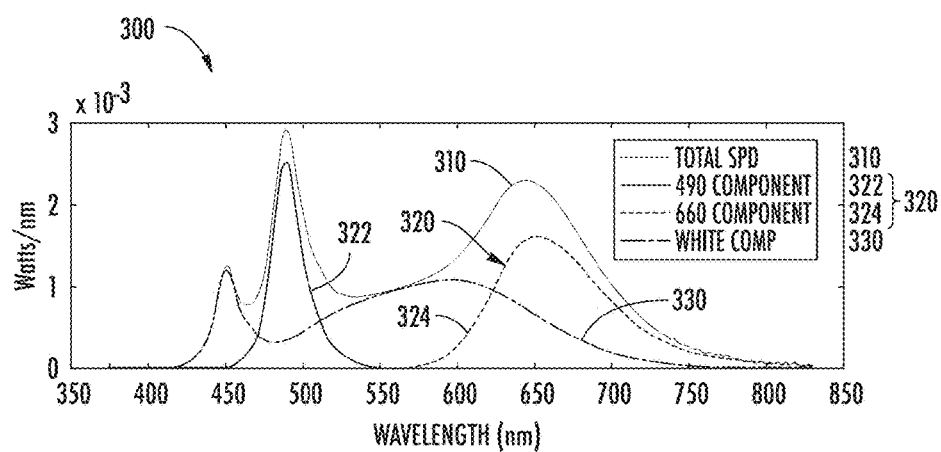
FIG. 3A is a graph of spectrum containing biological light, in accordance with some embodiments.
Figure 3B:
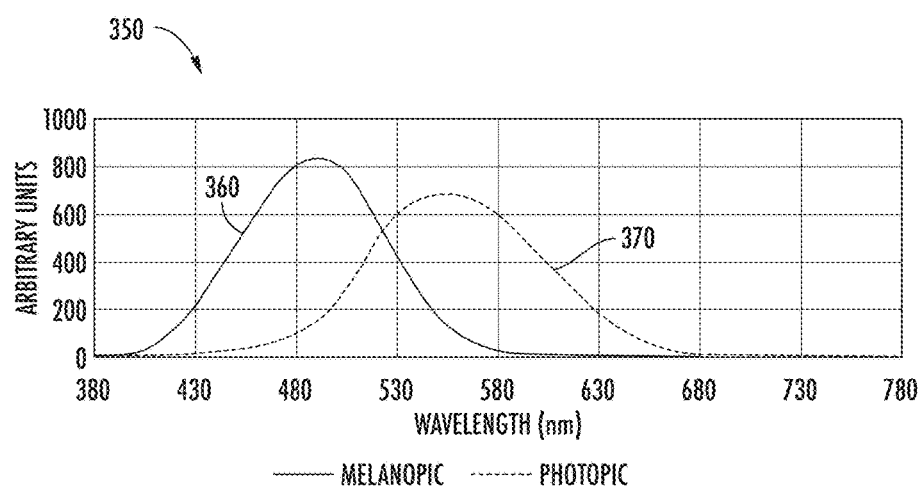
FIG. 3B is a graph of melanopic and photopic weighting functions for calculating a melanopic to photopic ratio, in accordance with some embodiments.

FIG. 3A shows a graph 300 representing an example embodiment of a spectrum containing biological light that may be delivered in the lighting systems of the present disclosure. In FIG. 3A, the y-axis is watts, and the x-axis is the wavelength in nanometers. The graph 300 shows a total spectral output 310 (i.e., spectral power distribution) that is a combination of traditional white light spectrum 330 and biological light 320. Biological light 320 includes wavelength peaks at 490 nm (curve 322) and 660 nm (curve 324) which may be emitted together from an LED module (or chip or channel) that shall be referred to in this disclosure as a SKYBLUE® supplement. In this disclosure, the relative amount of melanopic light in the spectrum that is being output by the lighting system shall be referred to as a melanopic to photopic (M/P) ratio. The M/P ratio is a melanopic lux per photopic lux, which is also known as an equivalent melanopic lux (EML). Specifically, the M/P ratio in this disclosure is calculated using weighting functions such as shown in FIG. 3B, which provide weighting based on photoreceptor sensitivity. These weighting functions are normalized to have equal area under the curve, but are not appropriately scaled relative to one another in this graph. Curve 360 is a weighting function that represents melanopsin sensitivity and is a wavelength distribution centered around approximately 490 nm. Curve 370 is a weighting function that represents photopic sensitivity and is a wavelength distribution centered around approximately 555 nm. The melanopic lux "M" is calculated as the dot product of the total spectral output 310 and the M weighting function, curve 360, while the photopic lux "P" is calculated as the dot product of the total spectral output 310 and the P weighting function, curve 370. The M/P ratio is then calculated as M divided by P. The weighting functions of curve 360 and curve 370 do not have equal sensitivity and are normalized such that if curve 360 and curve 370 were equal energy spectra, the M/P ratio would be 1. For example, in this embodiment, the y-axis of FIG. 3B is shown in arbitrary units that have weights of 683 for the photopic curve 370 (which corresponds to the number of lumens per watt at 555 nm) and 72,983 for the melanopic curve 360 (where the units are chosen to balance the curves 360 and 370 to have an M/P ratio of 1 at equal energy spectra).

In further embodiments, the biological light is adjusted by controlling a ratio of OPN5-targeted light to OPN4-targeted light, where an OPN5/OPN4 ratio is a ratio of an OPN5 lux to a melanopic lux. The melanopic lux is calculated as the dot product of the total spectral output and an M weighting function as described above, and the OPN5 lux is similarly calculated as the dot product of the total spectral output and an OPN5 weighting function. The OPN5/OPN4 ratio is controlled according to the dimming profile, where the dimming profile correlates the OPN5/OPN4 ratio to a percentage of the maximum current. In certain embodiments, a minimum OPN5/OPN4 ratio is output when the total current is equal to or greater than the setpoint, such that the OPN5/OPN4 ratio increases as the current is decreased. That is, at full output the system delivers a low amount of OPN5, and as the system is dimmed, the proportion of the lighting system's total current that is being delivered to an LED channel emitting OPN5-targeted light (e.g., 370 nm to 410 nm) increases compared to proportion of the total current to an LED channel emitting OPN4-targeted light (e.g., melanopic 480 nm to 500 nm).

The lighting systems of the present disclosure adjust the biological light, such as the M/P ratio or OPN5/OPN4 ratio, via dimming interfaces such as dimmer control 110 of FIG. 1. The dimming systems of the present disclosure are agnostic of the type of dimming interface being used and can be utilized with various types of dimmers such as, but not limited to, 0-10V, digital addressable lighting interface (DALI), electronic low voltage (ELV), or digital multiplex (DMX) types. The dimming can be performed either automatically or manually, such as automatically according to a time of day or manually as the user dims the light output during the course of the day. In some embodiments, the system may default to delivering certain biological light ratios according to the time of day (i.e., daylight level outputs during the morning and afternoon, and gradually dimming to nighttime levels according to sunset timing for that geographical area) while allowing a user to override the lighting level for a period of time by manually adjust the dimming level. For example, a user may temporarily increase the lighting level in an office space when they are working late, which will override the M/P (or OPN5/OPN4) ratio and the lighting level that would be delivered according to the time of day for the dimming profile.

The electrical current applied to an LED determines its brightness. Conventionally, luminaires or light fixtures oftentimes are configured to be too bright at the time of installation. Thus, the user's desired lighting level often needs to be established in the field, where a dimmer is used to achieve comfortable lighting if the levels are too bright. In conventional systems where a dimmer is used to reduce the amount of biological light, if a user dims the light for preference, then the lighting system will provide a lower biological light ratio than what was originally designed. In contrast, the present embodiments utilize a unique machine learning algorithm to develop an understanding of the maximum lighting level—that is, a setpoint—preferred by the user(s). The maximum lighting level is determined by measuring the electrical current to the lighting fixture (total current to all LEDs in the fixture) over time, from which the algorithm derives the setpoint. The electrical current corresponding to the setpoint is the maximum current that will be used in the dimming profile for the lighting fixture, where the dimming profile relates the biological light ratio to a percentage of the maximum current. That is, the M/P ratio or OPN5/OPN4 ratio is adjusted as the user or the system dims the light level during the day, where the change in ratio is scaled to the maximum current corresponding to the setpoint rather than by being determined by an absolute value of electrical current as in conventional systems. When the electrical current being used at a particular time is equal to or greater than the setpoint (e.g., if the user temporarily increases the dimmer higher than the setpoint), the maximum biological light ratio will be delivered and will not exceed the maximum prescribed biological light ratio of the diming profile.

In some embodiments, each percentage output (e.g., 10% of maximum current, 20%, 30%, etc.) of the dimming profile has a corresponding biological light ratio that will be delivered. If the setpoint is changed, as manually adjusted by the user and learned by the system to be an actual desired change, the percentage outputs will be scaled to that new setpoint, and the corresponding biological light ratios will be delivered at those percentage outputs of the setpoint. For instance, in one scenario using M/P ratio as an example, the lighting system may have a total rated forward current of 0.5 A and the dimming profile is designed to deliver a particular nighttime M/P ratio at 30% of the maximum current (i.e., at 0.15 A). If the system determines that the user prefers 0.4 A as the maximum lighting level, then the system will deliver the particular nighttime M/P ratio at 0.12 A which is 30% of the new setpoint (0.4 A). The re-scaling by the system of the dimming profile according to the maximum light level preferred by the user enables both the biological light and the overall lighting output of the system to be controlled by a single dimmer control, which improves ease-of-use compared to conventional systems.

Biological light and white light may have different efficacies. For example, the melanopic lumens per electrical watt of the biological light 320 in FIG. 3A may be different from the photopic lumens per electrical watt of the white light spectrum 330. In some embodiments, the dimming profiles of the present disclosure uniquely account for these differences in efficacies. In one example embodiment, the photopic lumens per watt are higher in the white light than in the biological light. Consequently, in a dimming profile that removes the biological light first, the photopic lumens remains fairly constant since the biological light is less efficient than the white light. In other words, embodiments of the present systems and methods beneficially consider the efficacies of specific light spectra such that, for example, wavelengths of blue light (e.g., melanopic) can be dimmed first without affecting the photopic lumens.

Figure 4A:
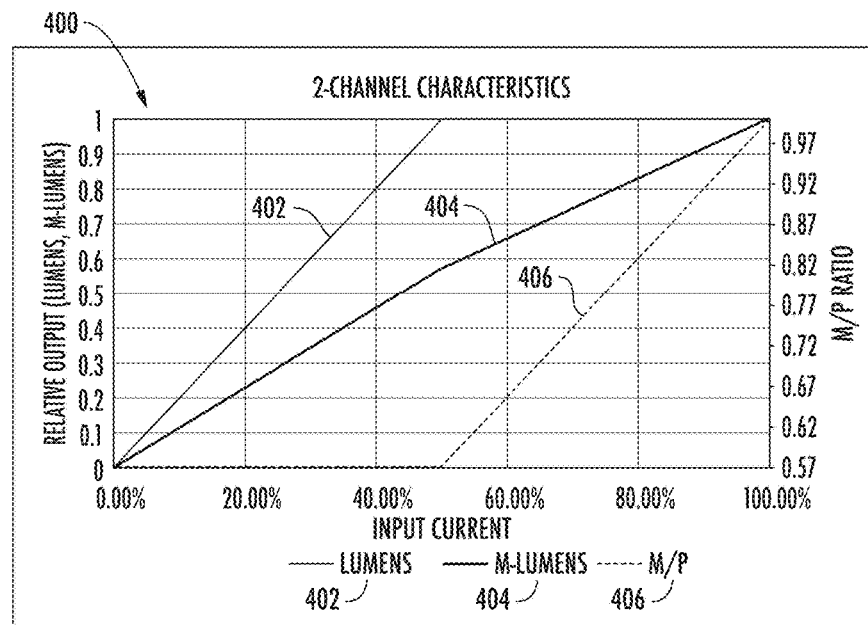
FIGS. 4A-4D are graphs representing dimming profiles as a function of input current, in accordance with some embodiments.
Figure 4B:
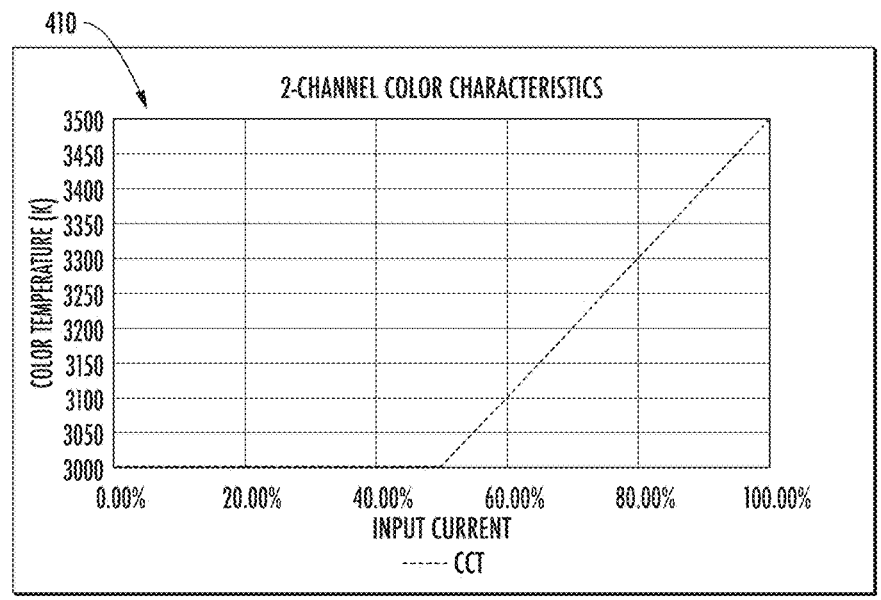
Figure 4C:
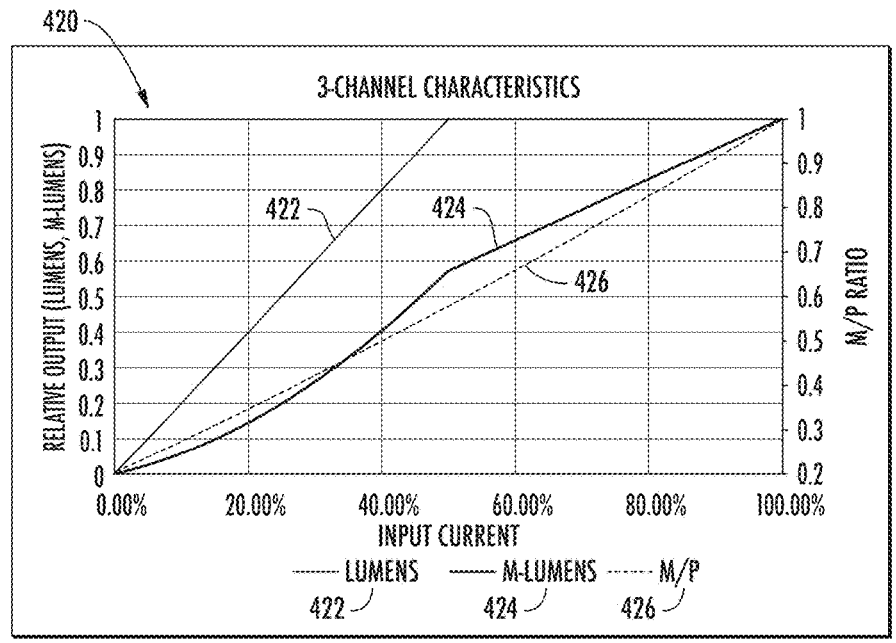
Figure 4D:
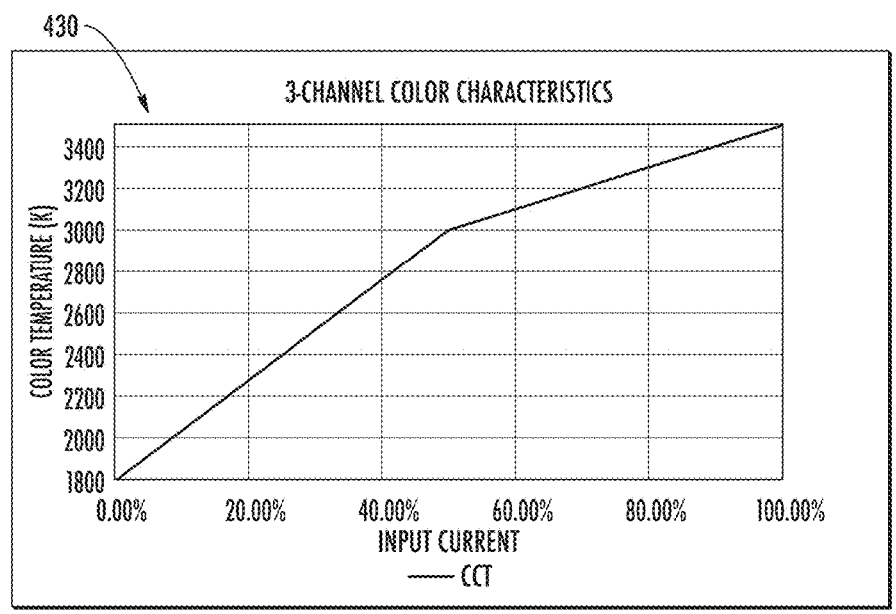

FIGS. 4A-4D show example dimming profiles, where FIGS. 4A-4B illustrate an embodiment of a 2-channel system (e.g., one LED channel for white light and a second LED channel for biological light) and FIGS. 4C-4D illustrate an embodiment of a 3-channel system (e.g., one LED channel for white light, a second LED channel for a melanopic component and a third channel for a far-red "twilight" component of biological light). FIGS. 4A and 4C show light output as a function of input current, while FIGS. 4B and 4D show color temperature as a function of input current.

Looking first at dimming profile 400 of FIG. 4A, the y-axis shows normalized lumens (relative output on a scale of 0 to 1) as well as M/P ratio. The x-axis shows the percentage of the maximum electrical current. In FIG. 4A, a plot of lumens (line 402), melanopic lumens (line 404, M-lumens), and M/P ratio (line 406, melanopic lux per photopic lux) over the course of the dimming profile is shown. In the dimming profile 400, melanopic lux per line 404 is reduced approximately linearly by the dimming interface, with a slight increase in slope when dimming below 50% current. However, visual stimulus (lumens per line 402) is reduced in a piecewise manner, with the lumens remaining constant on the upper portion (input current=50% to 100%) of the dimming interface and then decreasing linearly. Consequently, the M/P ratio per line 406 is also a piecewise function, having a linear response with a value of zero and a zero slope at lower intensities of brightness and a positive slope in the higher intensities. FIG. 4B illustrates the resulting color temperature graph 410, showing that the color temperature is reduced from 3500 K to 3000 K when the input current is reduced from 100% to 50% due to the decrease in M/P ratio.

The 3-channel dimming profile 420 of FIG. 4C shows a plot of lumens (line 422), melanopic lumens (line 424, M-lumens), and M/P ratio (line 426, melanopic lux per photopic lux). Similar to FIG. 4A, the visual stimulus (lumens per line 422) is reduced in a piecewise manner, with the lumens remaining constant on the upper portion of the dimming interface (input current=50% to 100%) and then decreasing linearly. The melanopic lux of line 424 has a similar slope as FIG. 4A when the current is greater than 50% but decreases more rapidly below 50% than in FIG. 4A. The resulting M/P ratio decreases at a slower rate than in FIG. 4A, but has a continuous decrease as the dimming current is reduced to 0% rather than in a piecewise manner as in FIG. 4A. FIG. 4D shows a color temperature graph 430 resulting from the dimming profile 420 showing that the color temperature has a much greater drop than in FIG. 4B, where the color temperature decreases from approximately 3500 K to 3000 K when the input current is dimmed from 100% to 50%, and then decreases to 1800 K at 0% current.

In other embodiments, dimming profiles other than linear may be used, such as logarithmic. In general, the reduction in M/P ratio (or OPN5/OPN4 ratio) within the dimming profiles may be implemented by changing the proportion of the total current to the various LED channels in the lighting fixture. For example, a proportion of the total current to an LED channel that generates biological light in the lighting fixture may be decreased at a higher rate (e.g., twice the rate) than a proportion of the total current to an LED channel that generates white light in the lighting fixture, when the total current is in a high percentage range of the setpoint (e.g., as the current is decreased from 100% to 50% of the maximum current). In general, reduction in melanopic light has less impact on light level in the high output range. Accordingly, in some embodiments the dimming profile uniquely utilizes this property by producing light in which the melanopic contribution can be reduced without a significant impact on the overall light (e.g., brightness and/or color temperature) in the high output range (e.g., over 50% of the maximum electrical current setpoint).

Figure 5:
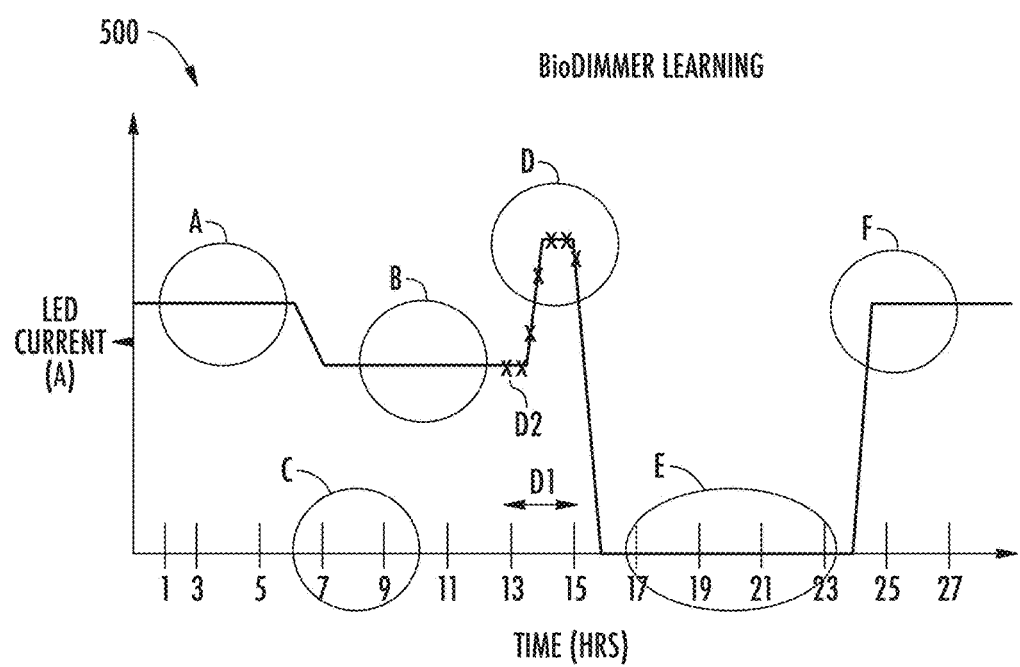
FIG. 5 is a graph illustrating operation of a machine learning algorithm, in accordance with some embodiments.

FIG. 5 is a graph 500 of LED current as a function of time, demonstrating aspects of a machine learning algorithm in accordance with some embodiments. The LED current of the y-axis represents the total current to all the LED modules in the lighting fixture, as adjusted by the user. The algorithm learns the user's light level preferences and monitors electrical currents to the LEDs continuously over time, delivering the proper biological light—where M/P ratio will be used in this example—based on the time of day or by the light level manually set by the user. Zone A of FIG. 5 represents the electrical current flowing through the LED panel at a particular time (starting at time=0 for illustration purposes), where the value may be determined by the initial start-up of the system, or an existing setpoint (the maximum current previously established by the system), or as adjusted by the user. If the current in zone A is at or above the setpoint (e.g., manually increased by the user), the maximum M/P ratio of the dimming profile is delivered. In the scenario of FIG. 5, the current in zone A shall be assumed to be the existing setpoint. In zone B, the M/P ratio is reduced because the user has adjusted the current to be lower than the setpoint. The M/P ratio is gradually changed to the new state, where the new state applies an M/P value according to the dimming profile that correlates the M/P ratio with the percentage output (i.e. the percentage that the electrical current is of the setpoint). The change in M/P ratio follows the dimming profile and may take place, for example, over several minutes, such as 1, 2 or 5 minutes (note the illustrated slope between zones A and B is not necessarily to scale).

To determine when the setpoint should be changed in response to a user's behavior, the machine learning uniquely uses algorithms that react more quickly to higher setpoints (the user "dimming up" up the light level) than lower setpoints ("dimming down"). This approach for adaptively learning the setpoint prevents erratic changes in setpoints and is based on a use-model in which users are more likely to dim down the light level during normal usage than increasing the light level. Thus, increases that are input by the user through the dimming control are viewed as being more likely to be intentional changes than occurrences of dimming down. To monitor dimming levels, the microprocessor measures the LED current over time and regularly records an average current for sampling periods that are a relatively short duration (e.g. 10-20 minutes). Then at regular intervals—the intervals being longer than the sampling periods such as bi-hourly as represented by zone C—the system saves the smallest value of the recorded sampling period averages from the interval in a buffer. Saving the smallest (minimum) values that were averaged in each sampling period serves to filter out periodic short-duration increases (i.e., dimming up) so that they do not influence the normal setpoint. The device maintains a buffer of the bi-hourly minimums over a sliding window, such as over the last 24 to 28 hours, or over the last 26 hours.

Zone D demonstrates an example effect of saving the smallest averages from the intervals. In zone D, the user has adjusted the current to a higher level for a short time. In the 2-hour interval "D1" between hours 13 to 15, the averages for each sampling period (e.g., every 15-20 minutes) are represented by an "X." In accordance with some embodiments, the value at D2 will be saved as the smallest average value for the interval D1, and the peak values in zone D will be discarded. Note that the M/P ratio delivered during the temporary increase in zone D will be the maximum ratio available in the dimming profile. The maximum M/P ratio cannot be exceeded even when the current is increased beyond the setpoint (i.e., the level of zone A).

From the saved minimum averages, the largest value in a sliding window (e.g. 24- to 26-hour sliding window) is pulled from the buffer and compared to the existing setpoint. That is, each time a new average value (e.g. a bi-hourly minimum average) is saved, the system looks back at the sliding window. The buffer may be, for example, a first-in-first-out (FIFO) buffer such that the system looks retroactively at the most recent usage trends for broad scope maxima from the local minima that were saved. This approach of using long period monitoring of the high values serves to filter out routine dimming since dimming down is part of the expected use model. In other words, in some embodiments longer period dim-down durations are tolerated and take longer to force a downward adjustment on the setpoint. When the largest average is found to be different from the existing setpoint, the setpoint will be updated to the new value. For example, if the largest average in the sliding window is higher than the existing setpoint, then the setpoint will be increased to the new value. Conversely, if the largest average in the sliding window is lower than the existing setpoint, then the setpoint will be decreased to the new value.

Importantly, the system requires the new value to be maintained for a certain time period before establishing a new setpoint, which results in a stable system that is not erratic but still is responsive to changes by the user. For example, having some amount of wait time before increasing the setpoint prevents transient activities such as cleaning crew activities or maintenance work from falsely affecting the setpoint. In some embodiments, the waiting time interval required for establishing a lower setpoint is longer than for establishing a higher setpoint. In other words, the microprocessor may be configured to set the setpoint by decreasing the setpoint when the largest of the plurality of smallest average values over a first time interval is less than an existing setpoint, and increasing the setpoint when the largest of the plurality of smallest average values over a second time interval is greater than an existing setpoint, where the second time interval is less than the first time interval. In some embodiments, for example, the first time interval required for a decreasing the setpoint may be 4 to 26 hours, such as 6 hours or 12 hours or 24 hours, while the second time interval required for increasing the setpoint may be 1 to 4 hours, such as 2 hours. When a new setpoint is determined, the system may implement the new setpoint instantaneously or may implement the new setpoint gradually, such as 5-15% of the total change per second, such as 10% per second.

In zone E the system is off, such as when a user is asleep or a workplace is closed. During this time, the buffer data and setpoint are saved, such as in a non-volatile memory of the microprocessor, so that the machine learning can resume with the previous historical data when power is restarted. The measuring of electrical currents and recording of smallest averages are discontinued when the system is off. Consequently, when the system is turned on at zone F, the M/P ratio to the LEDs is delivered at the already-established setpoint.

Figure 6:
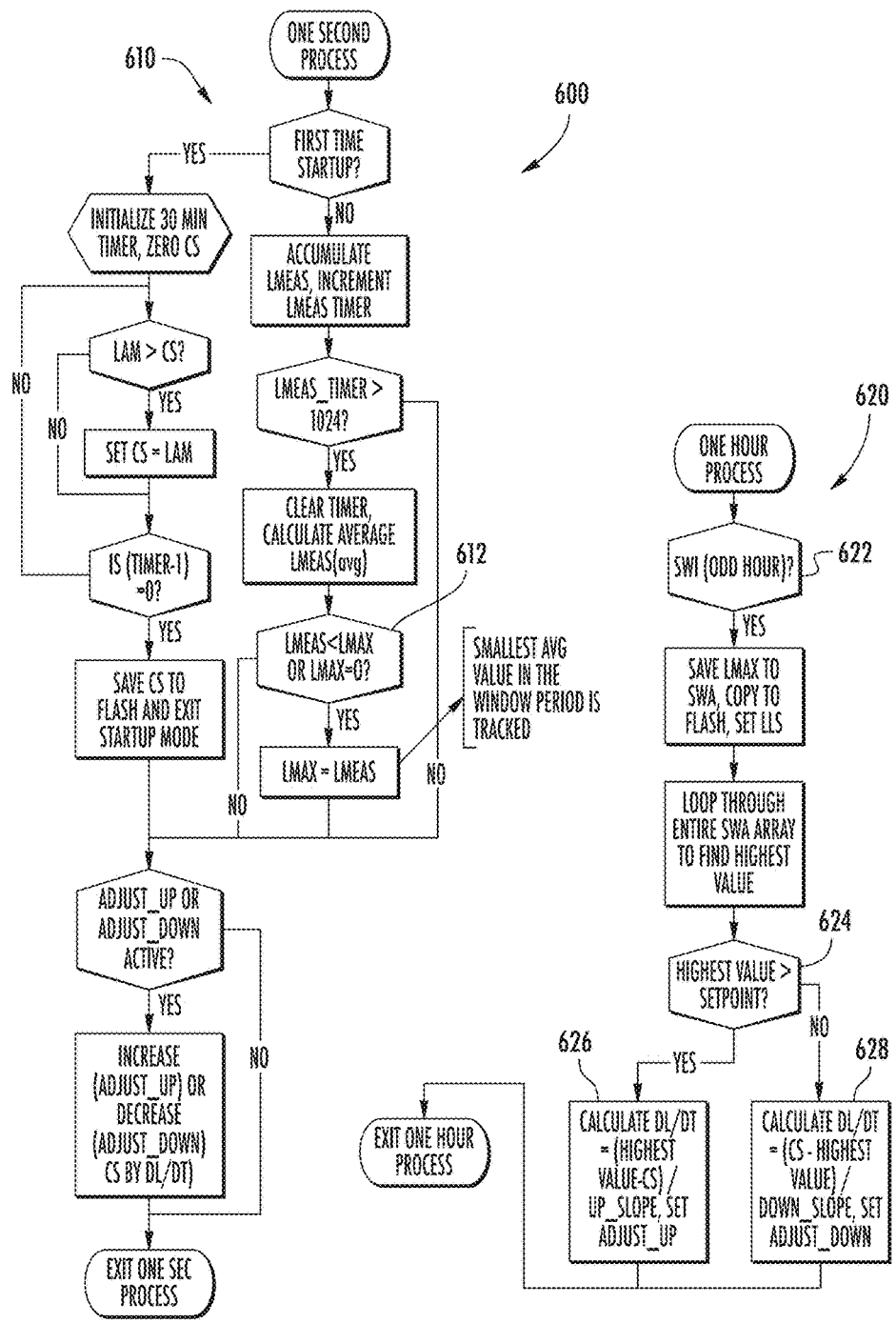
FIG. 6 is a flowchart of a machine learning algorithm, in accordance with some embodiments.

FIG. 6 is a flowchart 600 depicting details of the machine learning algorithm of the microprocessor, in accordance with some embodiments. Terminology used in the flowchart 600 is listed below, along with example values of one embodiment:

- CS=Current setpoint (level having the maximum biological light contribution)
- AM=Average current measurement (e.g., 32 samples at 16 kHz)
- LAM=Long period average current measurement (e.g., 32 samples of AM)
- LMEAS=Local (windowed) current (e.g., 1024 samples of LAM accumulated every second, represents average current over 1024 second period)
- LMAX=Largest LMEAS value in sliding window interval
- SWI=Sliding window interval. LMAX values are saved at this rate (e.g., may consist of odd hours, such as 1-25 hours, resulting in 13 data points)
- SWA=Sliding window current array. This is the array of LMAX points that will be tested at the SWI to determine if a CS adjustment is required.
- UP_SLOPE=Rate (time value, e.g., seconds) that the CS will be adjusted to new higher LAM setpoint (e.g., 180 seconds)
- DOWN_SLOPE=Rate (time value, e.g., seconds) that the CS will be adjusted to new lower LAM setpoint (e.g., 180 seconds)
- dI/dt=Incremental change to CS when a change is required, represented as a change in magnitude/adjustment slope.
- LLS=Last LMAX saved. This flag indicates an LMAX is saved to SWA, which is used to force the next LMEAS to LMAX to establish the next high value in the array (otherwise LMAX would perpetuate).
- ADJUST_UP=Process flag indicating CS is gradually being increased as a result of a learned adaptation.
- ADJUST_DOWN=Process flag indicating CS is gradually being decreased as a result of a learned adaptation.

The flow starting at step 610 is a function that is called every second, involving auto-sampling of electrical current measurements at a frequency that is preferably greater than the frequency used for the electrical current drivers of the system. For example, in the embodiment of FIG. 6, samples may be taken at 16 kHz. In some embodiments, the total current measurement is made by taking a single measurement of the current to the overall LED panel of a lighting fixture. In other embodiments, the total current measurement is made by taking measurements of individual LED channels and adding them together to derive the total current that will be used in subsequent calculations. Average values ("LMEAS") are calculated from the measurements of the total current over a sampling period, such as a period of 10 to 20 minutes, such as 17 minutes (1024 seconds) in the embodiment shown. A plurality of smallest average values is calculated from the measurements of the total current over a plurality of sampling periods. In the embodiment shown, each smallest average of the total current in a sliding window period is calculated by comparing LMEAS to a largest value (LMAX) in the sliding window period at step 612 and updating LMAX if LMEAS is less than LMAX. The sliding window interval may be, for example two hours (bi-hourly).

The flow 620 of FIG. 6 is a process that is performed for the sliding window interval, such as bi-hourly (e.g., on odd number hours per step 622) in the embodiment shown. The flow 620 sets a setpoint ("CS") based on the highest value of LMAX of the plurality of smallest average values, where the setpoint defines a maximum current to be used by the dimming profile (and at which the maximum biological light will be delivered). If the highest value of LMAX is greater than the setpoint at step 624, the CS is adjusted upward in step 626. If the highest value of LMAX is less than the setpoint at step 624, the CS is adjusted downward in step 628. The microprocessor then controls the M/P ratio according to the dimming profile, where the dimming profile correlates the M/P ratio to a percentage of the maximum current. For example, for a lighting fixture that has a first LED channel that emits a first spectrum comprising white light and a second LED channel that emits a second spectrum comprising biologically-tailored light (e.g., including 480-500 nm and 650-670 nm), the M/P ratio represents the relative amount of melanopic light being output. The microprocessor instructs the LED modules to output the maximum M/P ratio when the total current is equal to or greater than the setpoint.

In some embodiments, an open-loop neural network may be utilized to further refine the adaptation of lighting level setpoints. Various measurables that influence the adaptive response may be tracked, each of which are assigned a weight. The weights are combined with the measurables to calculated weighted factors. A computation of the weighted factors, such as by summing the weighted factors, may be used to affect the learning behavior of the system. Examples of measurables include, but are not limited to: elapsed time that the dimmer setting has been steady, elapsed time that the lighting fixture has been powered, total run time, setting (setpoint) at initial power-up, number of dimming adjustments that have been made since the power was turned on, number of dimming adjustments that have been made in the lighting fixture history, rates at which the user increases or decreases the dimming control, and magnitudes at which the user increases or decreases the dimming control. These measurables can be used to change, for example, how the wait-time intervals and the slopes at which new increased or decreased setpoints are implemented. For example, the measurables can be used to distinguish human-implemented or machine-implemented values of measured current. In another example, the measurables may be used to account for different fade rates capabilities of different lighting fixtures.

Figure 7:
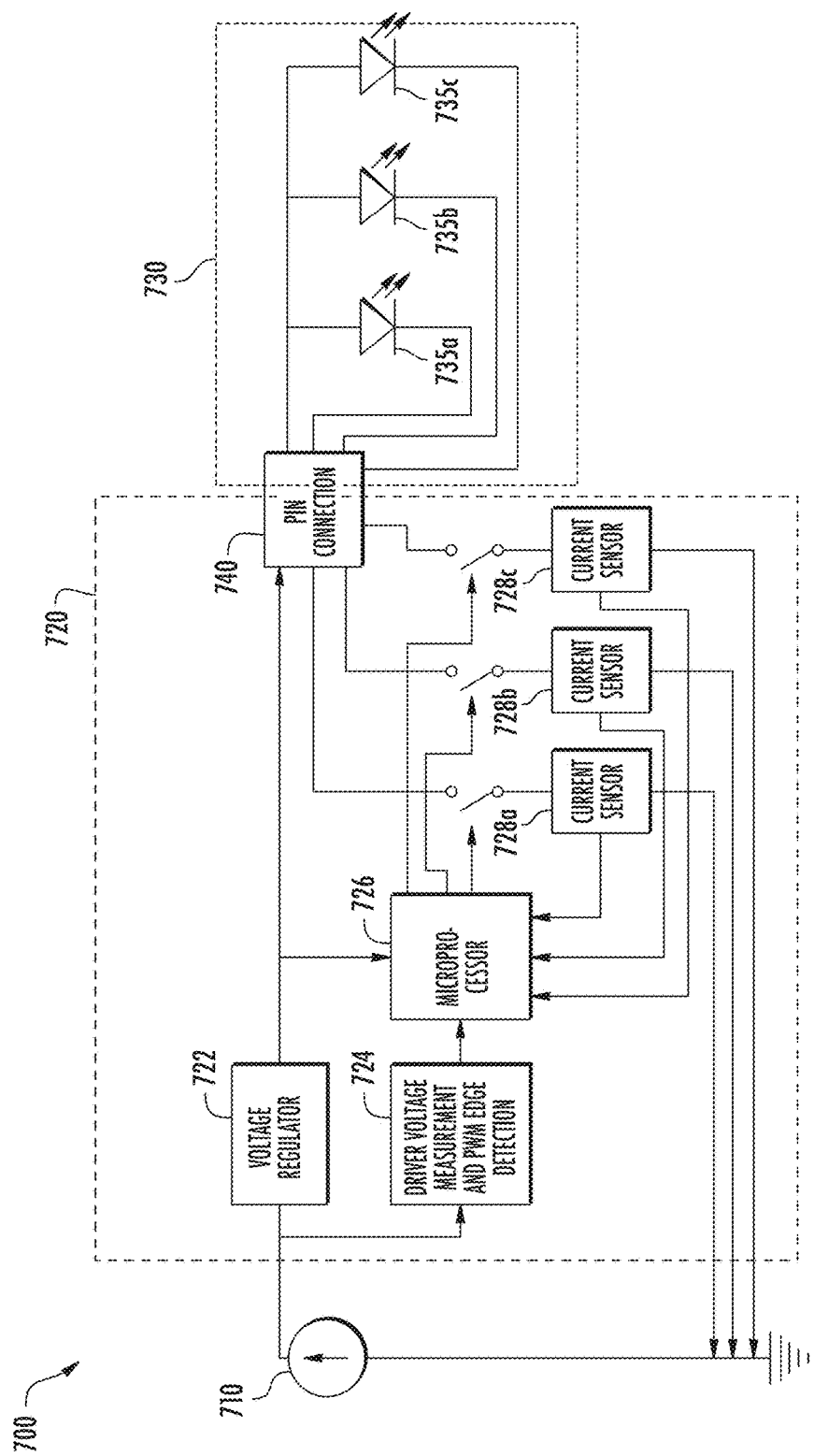
FIG. 7 is a schematic of a bio-dimming electrical circuit, in accordance with some embodiments.

FIG. 7 is an electrical circuit schematic of an embodiment of a dimming module circuit 700 that may be used in the lighting system 100 of FIG. 1. Circuit 700 includes a current driver 710, a bio-dimmer controller 720, and an LED engine 730. The bio-dimmer controller 720 measures the electrical current going through the LED engine 730 of the lighting fixture (e.g., lighting fixture 130 of FIG. 1). The measurements taken by circuit 700 enable the machine learning algorithm of microprocessor 726 (i.e., the microprocessor 120 of FIG. 1) to determine the maximum current provided to the LEDs, and consequently to determine a setpoint at which a maximum melanopic to photopic ratio is applied to the spectrum. The setpoint establishes the scale for the M/P dimming profile, where the setpoint is the maximum value of the scale.

LED engine 730 includes a first LED channel 735a, a second LED channel 735b and optionally a third LED channel 735c. First LED channel 735a may be, for example, a white light LED. Second and third LED channels 735b and 735c, respectively, may generate wavelengths corresponding to biological light such as OPN4 photoreceptor (melanopic), sub-dermal and/or OPN5 photoreceptor wavelengths which shall be described in more detail later in this disclosure. Bio-dimmer controller 720 includes a voltage regulator 722, circuitry 724 that performs driver voltage measurement and pulse-width modulation (PWM) edge detection, microprocessor 726, a first current sensor 728a, a second current sensor 728b and an optional third current sensor 728c. The current sensors 728a, 728b and 728c measure the currents of LED channels 735a, 735b and 735c, respectively, via connector 740 and provide the current measurements to microprocessor 726. In embodiments where the third LED channel 735c is present, the connector 740 may be a 4-pin connection. In embodiments where the third LED channel 735c is not present (i.e., the LED system is a 2-channel configuration), the connector 740 may be a 3-pin connection.

The hardware of circuit 700 incorporates real-time current measurement as the basis for the machine learning algorithm—adapting to the occupant's light level preferences by manipulating the balance of the biological (e.g., SKYBLUE) and white LED sources based on the electrical current and the electrical current history. Although in some embodiments the total current through all LED channels may be measured as a single quantity, in the embodiment illustrated in the circuit 700, the electrical current is measured in each LED channel separately. A benefit of measuring individual channels is identifying the current distribution (sharing) between the parallel white and biological light channels and compensating for them so that a predictable M/P ratio is provided. Current sharing is unbalanced when there is a difference in the forward voltage (Vf) characteristic of the channels. The forward voltage of an LED is variable, being subject to, for example, manufacturing variability, forward current (If), temperature, aging, and wavelength (band gap energy). LED current increases in a somewhat exponential fashion with increasing forward voltage, so small differences in the voltage characteristics of parallel LEDs creates substantial differences in current flow between them. In the present embodiments, a design that monitors current flow in the channels separately (e.g., $I_B$=SKYBLUE, $I_W$=white) as a function of the switched channel (SKYBLUE) duty cycle can calculate 'Normalized' $I_B$ as:

$$I_N(\text{Norm}) = \frac{I_B}{PWM \text{ Duty Cycle}}$$

And the current ratio between the channels as:

$$\text{Current Ratio} = \frac{I_B(\text{Norm})}{I_W + I_B}$$

The current ratio can be used to tune the duty cycle such that a predictable current distribution (and thus M/P lumens) can be delivered independent of voltage variations of the diodes.

Note that the current measurements described above may also be used to adjust current ratios of OPN5- and OPN4-targeted biological light.

Various embodiments of the dimmer learning of FIGS. 5-7 are possible. In some embodiments, the lighting systems have a single dimmer control that enables a user to adjust a total current to the lighting fixture. A microprocessor is configured to take measurements of a first current through a first LED channel (e.g., emitting a first spectrum comprising white light) and a second current through a second LED channel (e.g., emitting a second spectrum biological lighting having wavelength peaks from 650 nm to 670 nm and from 480 nm to 500 nm), where a sum of the first current and the second current is the total current. The microprocessor is also configured to store a plurality of smallest average values of the total current, set a setpoint based on a largest of the plurality of smallest average values and control a melanopic to photopic ratio (M/P ratio) according to a dimming profile. Each of the smallest average values is calculated from the measurements of current over a plurality of sampling periods. The setpoint defines a maximum current for the dimming profile of the lighting fixture. The dimming profile correlates the M/P ratio to a percentage of the maximum current, where the M/P ratio is a ratio of a melanopic lux to a photopic lux. A maximum M/P ratio is output when the total current being used in the lighting fixture is equal to or greater than the setpoint.

In some embodiments, the M/P ratio is changed by adjusting a first proportion of the total current to the first LED channel and a second proportion of the total current to the second LED channel. In some embodiments, the microprocessor is configured to set the setpoint by decreasing the setpoint when the largest of the plurality of smallest average values over a first time interval is less than an existing setpoint and increasing the setpoint when the largest of the plurality of smallest average values over a second time interval is greater than an existing setpoint, where the second time interval is less than the first time interval. For example, the first time interval may be from 24 to 26 hours and the second interval from 1 to 4 hours. In some embodiments, a second proportion of the total current to the second LED channel is decreased at a higher rate than a first proportion of the total current to the first LED channel when the total current is between 50% to 100% of the setpoint. For example, the second proportion may be decreased at twice the rate as the first proportion. In some embodiments, the plurality of smallest average values and the setpoint are saved in a non-volatile memory.

In some embodiments, a lighting fixture includes a first LED channel that emits a first spectrum comprising white light, a second LED channel that emits a second spectrum comprising biologically-tailored light having wavelength peaks from 650 nm to 670 nm and from 480 nm to 500 nm, and a third LED channel that emits a third spectrum having a wavelength peak from 370 nm to 410 nm. A single dimmer control enables a user to adjust a total current to the lighting fixture. A microprocessor of a lighting control system is configured to take measurements of current, set a setpoint based on a plurality of average values of the total current, and control an OPN5/OPN4 ratio (ratio of an OPN5 lux to a melanopic lux) according to a dimming profile. Current measurements are taken by measuring a first current through the first LED channel, a second current through the second LED channel and a third current through the third LED channel, where a sum of the first current and the second current and the third current is the total current. The setpoint defines a maximum current for a dimming profile of the lighting fixture. In some embodiments, the microprocessor is configured to store the plurality of average values, each of the average values being a smallest average value over a sampling period; and set the setpoint based on a largest of the plurality of average values over a time interval. In some embodiments, the microprocessor is configured to set the setpoint by decreasing the setpoint when the plurality of average values over a first time interval is lower than an existing setpoint, and increasing the setpoint when the plurality of average values of the total current over a second time interval is greater than the existing setpoint, where the second time interval is less than the first time interval. The dimming profile correlates the OPN5/OPN4 ratio to a percentage of the maximum current. A minimum OPN5/OPN4 ratio is output when the total current is equal to or greater than the setpoint.

Biological Light

The lighting systems of the present embodiments may use various biological spectral distributions depending on the application such as an office space or home environment, or daytime-only use versus day and night use. In some embodiments, spatial considerations are also incorporated into the dimming profiles, in which color separation of different spectra can be implemented for fixtures with uplighting and/or downlighting.

The lighting systems of the present embodiments utilize biological light that includes multiple wavelengths having biological significance. The suprachiasmatic nuclei in the hypothalamus regulate circadian rhythms using input from ganglion cells in the retina. The ganglion cells contain proteins called opsins, where melanopsin (OPN4) responds to the wavelength of 490 nm. Illumination profiles of the present embodiments include this melanopsin spectral component relevant to optical input.

Furthermore, in a recent study by Ota, et al., "Impaired Circadian Photoentrainment in OPN4-Null Mice," iScience, p. 299-305, Aug. 31, 2018, it was found that OPN5, which has peak absorption at 380 nm, also plays a role in photoentrainment. In some embodiments, the lighting spectra may also uniquely include a peak wavelength at around 380 nm. Because some plastics—such as polycarbonate and poly(methyl methacrylate) that are commonly used for light fixtures—attenuate light below 400 nm, some embodiments that target OPN5 may utilize wavelengths up to 410 nm. For example, the embodiments of biological spectra include wavelength peaks from 480 nm to 500 nm and/or from 370 nm to 410 nm, where these peaks are present when the lighting output is at its maximum level of the dimming profile. That is, the biologically significant wavelengths are present at the maximum current of the dimming profile. The biologically significant wavelengths may decrease or increase as the current is reduced, according to the specific dimming profile.

In the eye, the interaction between rods, cones and melanopsin is nuanced. Under bright light (daytime) conditions, melanopsin plays a large role in circadian regulation, receiving some minor inputs from cones. Thus, melanopic lux is the proper metric for daytime use. Under low light (nighttime) conditions, melanopsin impact is limited and cones become a large contributor to circadian regulation, with contributions from rods. Thus, it is believed that photopic lux is the proper metric for nighttime use. Additionally, spatial distribution of light plays a significant role in the impact of light on the eye's photoreceptors. That is, light coming from above the horizon (and being received in a downward direction by the eye) has a much stronger impact on melanopsin-related photoreceptors than light coming from below the horizon (being received in an upward direction). In some embodiments, the lighting systems of the present disclosure beneficially target and optimize biological effects using lighting via spatial distribution and/or spatial modulation of illumination systems (which may also be referred to as color separation in this disclosure), such as by creating layers of light that illuminate different surfaces at different times of day (e.g., high vertical illumination during biological daytime, and low vertical illumination during biological night time).

Figure 8:
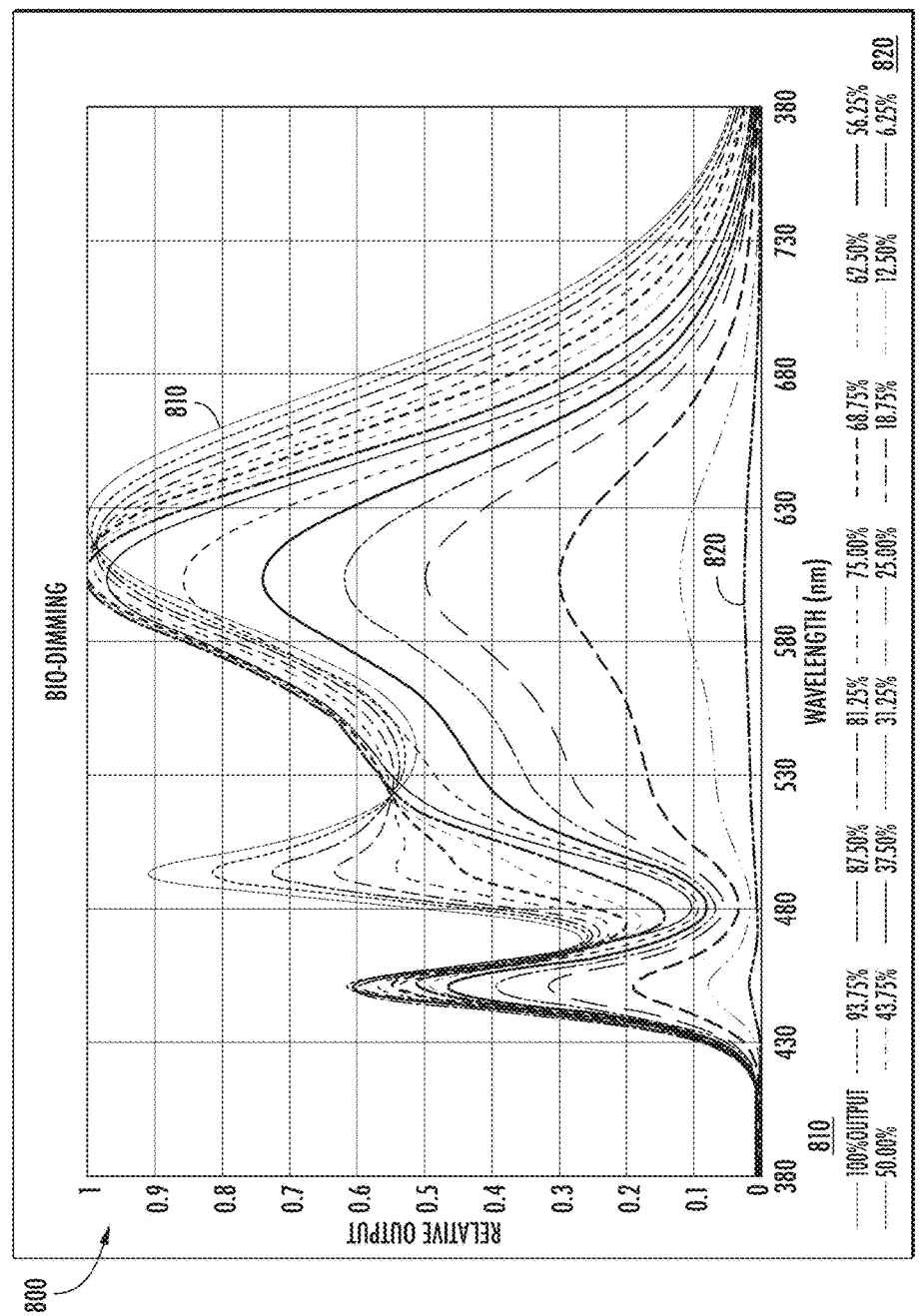
FIG. 8 shows a graph of a biological lighting spectrum and dimming profile, in accordance with some embodiments.

Illumination profiles also include enhanced spectral components that are relevant to the skin's optical window and sub-dermal cellular stimulation (e.g., deep-red and/or infrared). When considering color separation, embodiments of the present disclosure uniquely recognize that visual stimulus is not the only area of importance. Far-red wavelengths have deeper skin penetration allowing for secondary pathways to enhance the circadian signal. One mechanism that drives this response is via the mitochondria, which contain a chromophore cytochrome C oxidase. Upon radiation of cytochrome C oxidase, ATP density increases providing intercellular signaling and increased daytime alertness levels. Additionally, these far-red wavelengths provide an increase in core body temperature, which further aids in circadian entrainment. In some embodiments, maximum intensity spectra include additional far-red wavelengths designed to aid in providing extra daytime signals. The far-red wavelengths may be in the range from 630 nm to 1100 nm, such as 700 nm to 800 nm, such as having a peak around 660 nm or 720 nm, Some embodiments uniquely utilize lighting spectra that include both 490 nm for optical stimulation and 660 nm for sub-dermal cellular stimulation. For example, some embodiments include wavelength peaks from 650 nm to 670 nm and/or from 480 nm to 500 nm and/or from 370 nm to 410 nm, where these peaks are present when the lighting output is at its maximum level of the dimming profile. Some embodiments include wavelength peaks greater than about 700 nm and/or wavelength peaks from 480 nm to 500 nm and/or from 370 nm to 410 nm, where these peaks are present when the lighting output is at its maximum level of the dimming profile FIG. 8 is an embodiment of a graph 800 showing a first biological lighting spectrum, which shall be referred to as a "bio-dimming" spectrum in this disclosure. The graph 800 represents a dimming profile in which the output levels of the spectrum changes as the input current is decreased, such as being adjusted manually by a user or automatically by the lighting control system. Designed for offices or daytime-only spaces, this dimming profile allows the opportunity to remove melanopic (490 nm) biological potency in late night hours by reducing a high biological output to a low biological output. The graph 800 shows relative output on the y-axis (i.e., output normalized to a scale of 0 to 1) as a function of wavelength for varying percentages of output. For example, 100% output curve 810 represents when the amount of current is being delivered at or above the setpoint, where the setpoint is determined by the machine learning algorithm. The subsequent curves represent spectral distributions that will be delivered when the current is at decreasing percentages of the setpoint. At full output curve 810 (the maximum current of the dimming profile), the significant wavelength peaks represent white light combined with melanopic light in the 480 nm to 500 nm range (e.g., 490 nm) and sub-dermal stimulation light in the 650 nm to 670 nm range (e.g., 660 nm), where the 660 nm peak appears as a broad peak in the range from 600 nm to 660 nm due to the combination with white light. The peak near 460 nm is also due to the white light. The full output curve 810 also includes higher amounts of far-red wavelengths (e.g., 660 nm and above or 720 nm and above) than conventional white light spectra, to provide additional circadian entrainment through skin penetration.

As the spectrum of graph 800 is dimmed from full output curve 810 to low output curve 820 (illustrated as 6.25% of the maximum current in this embodiment), the biological light in the 480-500 nm range is gradually removed (e.g., linearly as a function of percentage of the maximum current in some embodiments). The sub-dermal (deep red) components are also removed as the dimming profile is decreased. In one embodiment the bio-dimming spectrum of graph 800 can be implemented by a 2-channel LED design in which one LED chip (i.e., LED channel) generates white light and the other LED chip generates the biological light (melanopic and sub-dermal). For example, the white light may have a correlated color temperature (CCT) of 2700 K to 4000 K (e.g., approximately 3000 K or 3500 K), and the biological light may be generated by the SKYBLUE supplement LED as described earlier. As the total current to the lighting fixture is dimmed, the proportion of light between the two chips is adjusted to achieve the various M/P ratios shown by the curves in FIG. 8. Other embodiments of LED channels for implementing the bio-dimming spectrum are possible, such as the 3-channel LED embodiment described in relation to FIGS. 4C-4D.

The correlation between M/P ratio and percentage reduction of electrical current can be different from the profiles shown in FIG. 8, such as using linear, logarithmic, or piecewise correlations as described in relation to FIGS. 4A-4D. In some embodiments, the dimming profiles uniquely remove biological light at a faster rate than the white light at high output levels (e.g., 50%-100% of the setpoint) without impacting the overall visual light. This minimal impact on visual light (e.g., brightness, color temperature and/or color rendering index "CRI") occurs because the 480-500 nm wavelength range has less impact on visual light than white light. For example, a 50% reduction in the 480-500 nm peak might only reduce the visual brightness (lumens) by 10%. This higher rate of removal in biological light is demonstrated in FIG. 8 by the wider spacing between the percentage output curves near the 490 nm peak compared to the closer space of the curves in the 600 nm range, for outputs greater than about 50%. In one embodiment, the dimming profile beneficially creates only a 500 K shift from full output to a fully dimmed output, such as shifting from a 4000 K daytime spectrum with CRI=86, cyanosis observation index (COI)=3.0 and M/P=0.95 at full output (setpoint) to a 3500 K nighttime spectrum with CRI=83 and M/P 0.55 at a fully dimmed setting.

In some embodiments, the white light in the spectra used in the dimming profiles include compensation for a 10-degree observer rather than a 2-degree observer as in conventional systems. For example, the spectrum of light from a light emitting apparatus may be engineered (or tailored) to have desired chromaticity coordinates (e.g., in the CIE 1931 color space diagram using the 1964 10° Supplementary Standard Observer). For example, an LED can have an emission spectra with a strong peak in the range of 480 nm to 500 nm and the spectrum of the LED can be tailored such that when the LED is combined with a traditional white LED (e.g., with spectrum 330 shown in FIG. 3) the combined light appears white (e.g., has chromaticity coordinates within the ANSI 4000 K Bin in the CIE 1931 color space diagram). In some embodiments, LEDs with melanopic emission spectra are designed to have vector shifts in their chromaticity coordinates from the CIE 1931 2-degree Standard Observer (i.e., the 2-degree observer) to the CIE 1964 10-degree Standard Observer (i.e., the 10-degree observer) in the CIE 1931 color space diagram, in the negative X and positive Y directions. This is in contrast with traditional white light LEDs which have vector shifts when moving from the 2-degree to the 10-degree observers in the positive X and negative Y directions. In some embodiments, the large shift in the chromaticity coordinates between the 2-degree to the 10-degree observers for LEDs with melanopic emission spectra requires that the 10-degree observer is used when tailoring the chromaticity coordinates of these LEDs. For example, when conventional methods using the 2-degree observer are used to tailor the chromaticity coordinates of light from an LED with a melanopic emission spectrum and light from a white LED, such that the combined light has chromaticity coordinates within a region of the CIE 1931 color space diagram that should appear white, then the combined light will have a color that may not appear white to a typical observer. The combined light may in fact appear slightly greenish, which is commonly considered an undesirable color of light for a white light source intended for lighting applications. In some embodiments, the 10-degree observer color matching functions are better predictors of the actual perceived color of an individual. When the 10-degree observer is used to tailor the chromaticity coordinates of light from the LED combination as described above, then the combined light may appear white to a typical observer and have improved visual aesthetic qualities compared to conventional circadian LED systems.

Figure 9:
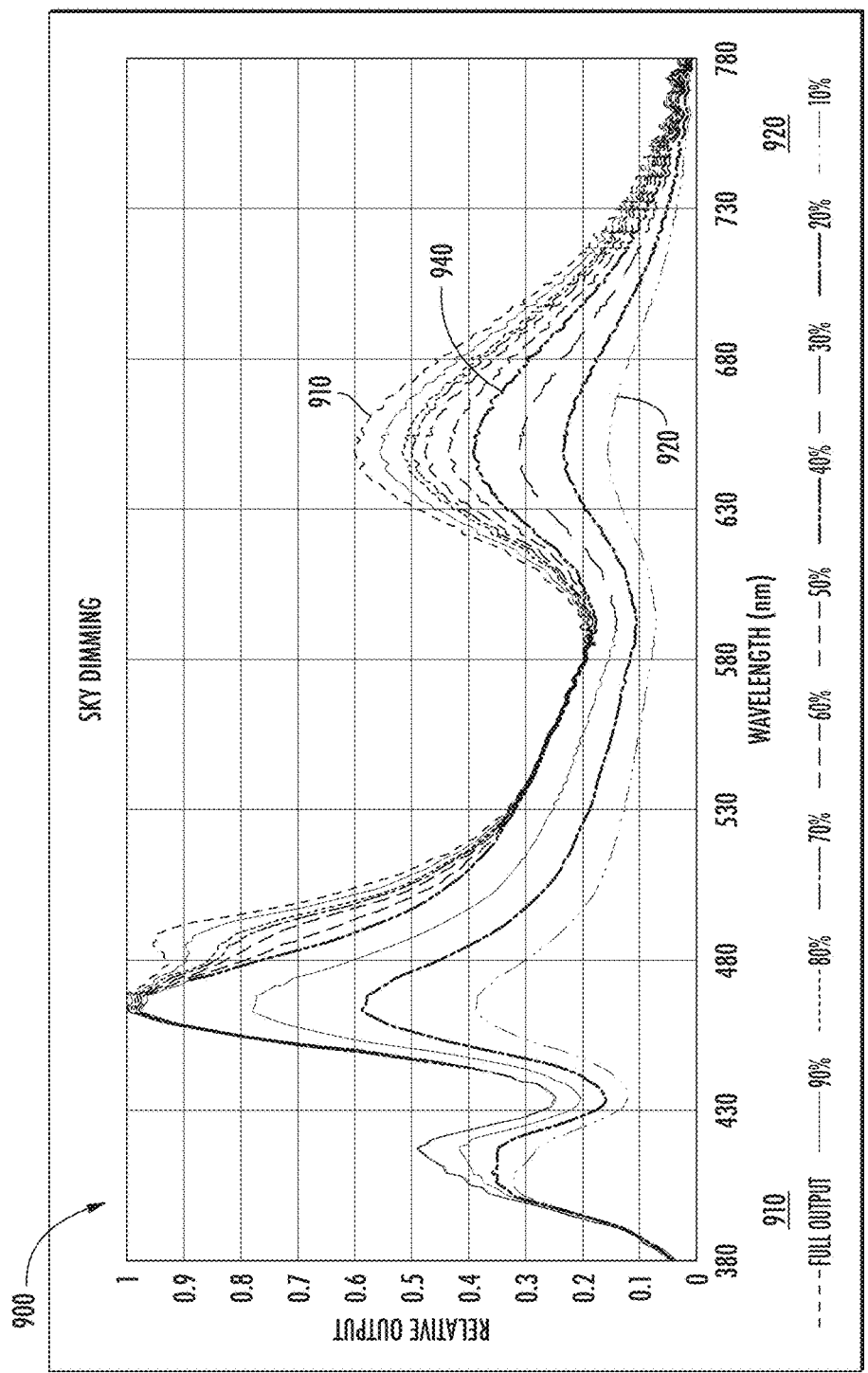
FIG. 9 shows a graph of another biological lighting spectrum and dimming profile, in accordance with some embodiments.

FIG. 9 is a graph 900 showing an embodiment of another biological lighting spectrum that may be used in the dimming profiles of the present disclosure, where the spectrum of graph 900 shall be referred to as "sky-dimming" in this disclosure. This sky-dimming spectrum simulates natural light above the horizon, including a wavelength peak near approximately 380 nm that occurs at twilight. The embodiment of the sky-dimming spectral distribution shown in FIG. 9 includes white light combined with melanopic light in the 480 nm to 500 nm range, sub-dermal stimulation light in the ranges of 650 nm to 670 nm (e.g., 660 nm) and/or 700+ nm, and twilight (i.e., OPN-5 targeted light) in the 370 nm to 410 nm range. The peaks in the ranges of approximately 600 nm to 660 nm and near 460 nm are due to the white light. The melanopic light in some embodiments has a peak wavelength between from 465 nm to 495 nm, with a full-width half maximum from 450 nm to 500 nm. In some embodiments, the sky-dimming profile can be implemented by a 3-channel configuration of 1) a custom chip (e.g., a cold white light spectrum of CCT in a range from 8000 K to 20,000 K, such as about 17,000K, with peaks in emission at 420 nm, 465 nm and 660 nm; and having a maximum peak around 460-470 nm, such as 465 nm), 2) a melanopic LED channel (e.g., 480-500 nm), and 3) an OPN5 LED channel (e.g. 370-410 nm, or 405 nm, or 380 nm). In some embodiments the melanopic LED channel may include white light compensation for a 10-degree observer. In some embodiments, the sky-dimming profile can be implemented by a 2-channel configuration in which the melanopic LED is omitted, such as a 2-channel configuration of the custom chip and the OPN5 LED channel described above.

As can be seen in FIG. 9, the sky-dimming profile of graph 900 maintains a peak in the twilight range (370 nm to 410 nm) throughout all dimming profile settings from the 100% output curve 910 down to the lowest setting curve 920 (10% being the lowest output illustrated in this graph), increasing the OPN5/OPN4 ratio from a minimum value to higher values as dimming occurs per the dimming profile. In some embodiments, the sky-dimming profile 900 may use only a portion of the curves shown in FIG. 9. For example, a full output of 100% maximum current may implement the curve 940 (which is the 40% level of the full graph 900), and the spectrum is adjusted from curve 940 to curve 920 as the current is decreased.

The sky-dimming spectrum of graph 900 provides significant contribution of the twilight wavelengths at both the beginning and the end of the day. In addition, the sky-dimming profile of graph 900 presents a shift in wavelength peaks. OPN5 with peak sensitivity near 380 nm contributes to the delineation of day versus night, providing an amplification of subsequent light exposure (either making brighter days or darker nights). This is important considering that people spend the majority of their time inside under electric lighting that is too dim to be considered day and too bright to be considered night. During twilight, as the sun sets, more atmosphere is between the sun the observer, leading to an increase of Raleigh scattering potential. This leads to a combined reduction in intensity and an increase in the relative proportion of short wavelengths near the peak sensitivity of OPN5. Thus, during operation of dimming full output curve 910 toward low output curve 920, the sky-dimming profile of graph 900 implements a twilight sequence that increases the ratio of OPN5 wavelengths relative to other wavelengths. This increase in the relative amount of 370 nm to 410 nm (e.g., 380 nm) wavelengths as the light is dimmed beneficially provides a more natural twilight scenario than conventional lighting systems. In further embodiments, the sky-dimming spectrum may be used to provide spatial distributions of light. For example, the sky-dimming spectrum may be used to illuminate the ceiling (i.e., uplighting), or may be a stand-alone fixture (e.g., cove), or may be used in an upward portion of an up/down light.

Figure 10:
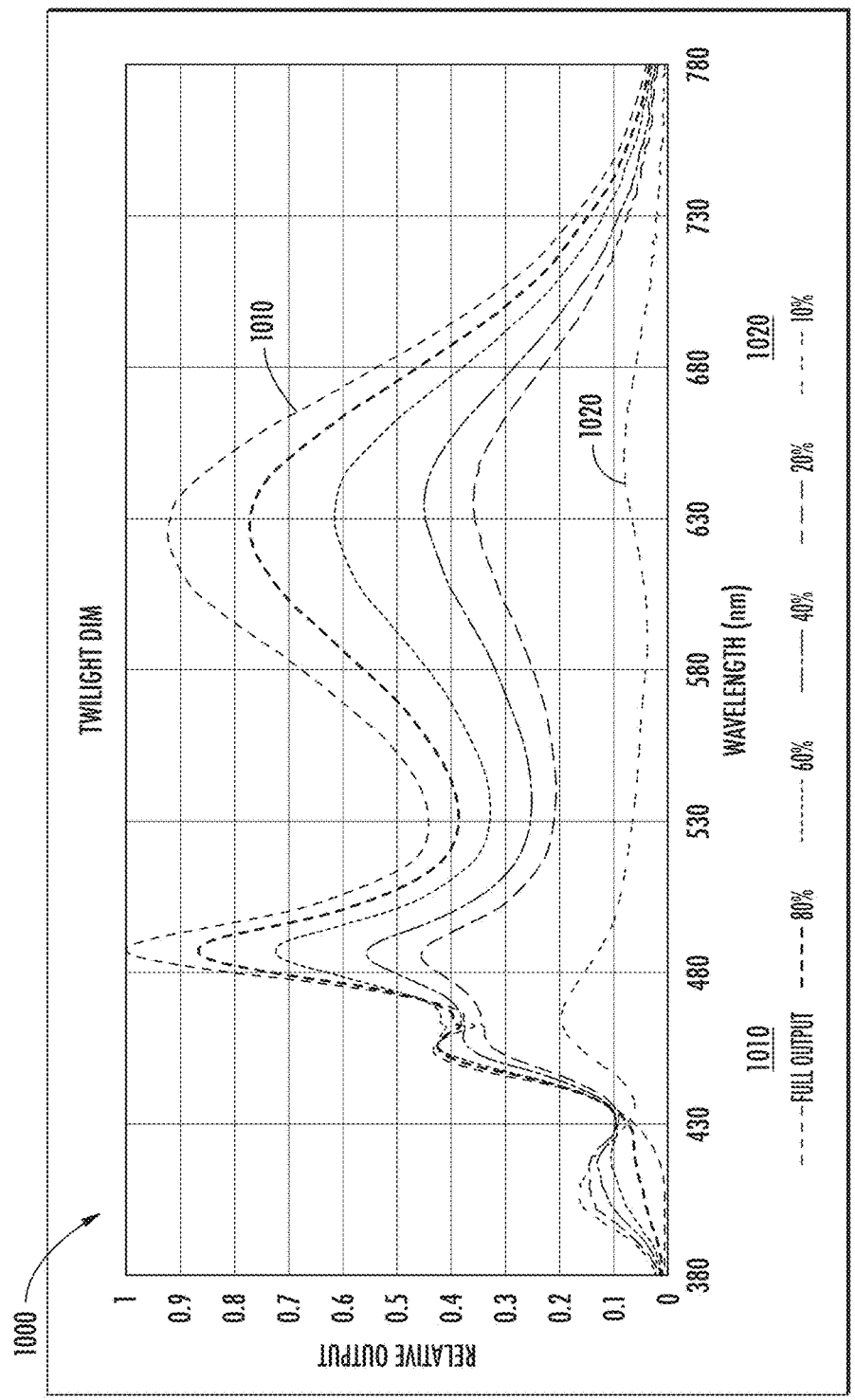
FIG. 10 shows a graph of a further biological lighting spectrum and dimming profile, in accordance with some embodiments.

FIG. 10 shows a graph 1000 showing an embodiment of a spectrum that shall be referred to as "twilight dim" in this disclosure, that combines the bio-dimming spectrum of graph 800 and sky-dimming spectrum of graph 900 into a single spectrum. Thus, the twilight dim spectrum of graph 1000 is a dimming profile that provides varying melanopic and sub-dermal amounts as well as the 370-410 nm (e.g., 380 nm) OPN5 wavelength at the end of the day. In particular, the proportion of OPN5-targeted light is increased as the current is reduced. That is, the dimming profile correlates an OPN5/OPN4 ratio to a percentage of the maximum current, where the OPN5/OPN4 ratio is a ratio of an OPN5 lux to a melanopic lux and a minimum OPN5/OPN4 ratio is output when the total current is equal to or greater than the setpoint. The twilight dim spectrum of graph 1000 may be used in a single fixture as a downlight or as an uplight. At full output 1010, the melanopic wavelength (480 nm to 500 nm) and sub-dermal component (660 nm, which appears as a peak around 630 nm in combination with white light) are the significant components of the twilight dim, while at greatly dimmed levels (e.g. low output curve 1020 representing 10% output in this example) the twilight wavelength (370 nm to 410 nm) becomes the dominant peak.

Figure 11:
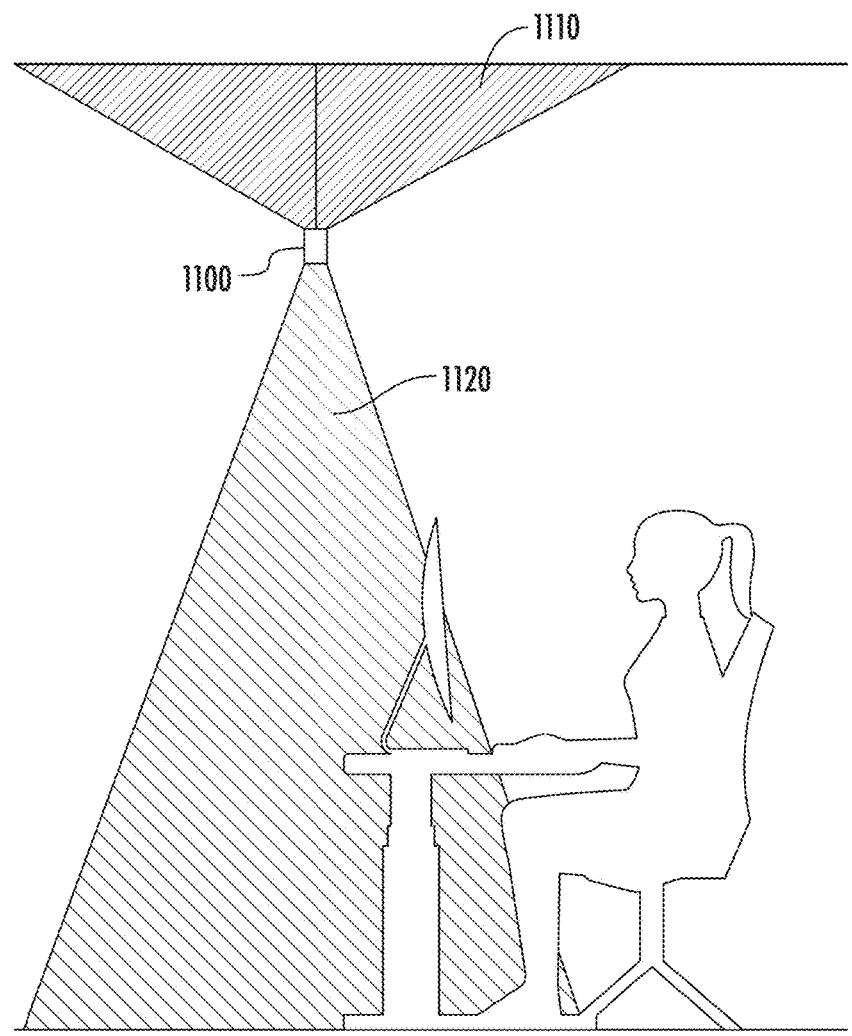
FIG. 11 is a schematic of a biological lighting system with color separation, in accordance with some embodiments.

FIG. 11 shows an example of a biological lighting system being implemented with color separation, in which melanopic (e.g. 490 nm) and twilight (e.g. 380 nm) components are spatially directional. The lighting fixture in this example is a pendant fixture 1100 that has lighting components in both the upward direction (i.e. upward away from the ground) and the downward direction (i.e., downward toward the ground). In one embodiment, the sky-dim profile of FIG. 9 can be used for the uplight 1110 and the bio-dimming profile of FIG. 8 can be used in the downlight 1120. In another embodiment, the twilight-dimming profile of FIG. 10 can be used for the uplight 1110 and the bio-dimming profile of FIG. 8 can be used in the downlight 1120. As light levels are dimmed, the bio-dim profile in the downlight 1120 reduces the melanopic and sub-dermal components, while the sky-dim in the uplight 1110 reduces the melanopic and sub-dermal components but maintains the twilight (OPN5) component. Thus, the twilight 380 nm effect is emanated from above the "horizon" to simulate natural sunlight and to more effectively stimulate optical photoreceptors.

The present embodiments include various combinations of the biological lighting profiles and spatial configurations described herein. In some embodiments, a lighting fixture includes a first LED channel that emits a first spectrum comprising white light and a second LED channel that emits a second spectrum comprising biologically-tailored light. The biologically-tailored light has a first wavelength peak in a range from 650 nm to 670 nm and a second wavelength peak in a range from 480 nm to 500 nm. In some embodiments, the first wavelength peak and the second wavelength peak in the second spectrum (in the ranges from 650 nm to 670 nm and from 480 nm to 500 nm) are present at the maximum current of the dimming profile. The lighting fixture further may further include a third LED channel that emits a third spectrum having a third wavelength peak in a range from 370 nm to 410 nm. In some embodiments, the first spectrum, the second spectrum and the third spectrum (if present) are all emitted in a downward direction toward the ground. In some embodiments, the dimming profile has a fully dimmed setting in which the third wavelength peak that is in a range from 370 nm to 410 nm is the maximum wavelength peak emitted by the lighting fixture. In some embodiments, as the total current is reduced, the dimming profile increases a proportion of the total current that is delivered to the third wavelength peak that is in the range from 370 to 410 nm emitted from the third LED channel.

In some embodiments, a lighting fixture includes a first LED channel that emits a first spectrum comprising white light, a second LED channel that emits a second spectrum comprising biologically-tailored light having a first wavelength peak that is in a range from 650 nm to 670 nm and a second wavelength peak that is in a range from 480 nm to 500 nm, and a third LED channel that emits a third spectrum having a third wavelength peak that is in a range from 370 nm to 410 nm. A microprocessor is configured to take measurements of a first current through the first LED channel, a second current through the second LED channel and a third current through the third LED channel, wherein a sum of the first current and the second current and the third current is the total current. The microprocessor is also configured to set a setpoint based on a plurality of average values of the total current, wherein the setpoint defines a maximum current for a dimming profile of the lighting fixture. The microprocessor is also configured to control an OPN5/OPN4 ratio according to the dimming profile. The dimming profile correlates the OPN5/OPN4 ratio to a percentage of the maximum current, where the OPN5/OPN4 ratio is a ratio of an OPN5 lux to a melanopic lux, and where a minimum OPN5/OPN4 ratio is output when the total current is equal to or greater than the setpoint. In some embodiments, the white light has a color correlated temperature that is in the range from 8000 K to 20,000 K, or from 2700 K to 4000 K. In some embodiments, the first wavelength peak and the second wavelength peak (in the ranges from 650 nm to 670 nm and from 480 nm to 500 nm)

of the second spectrum are present when the maximum current of the dimming profile is delivered to the lighting fixture. In some embodiments, the first spectrum, the second spectrum and the third spectrum are all emitted in a downward direction. In some embodiments, the first spectrum, the second spectrum and the third spectrum are all emitted in an upward direction away from the ground, where further embodiments may include a second lighting fixture that emits light in a downward direction toward the ground, the second lighting fixture including i) a fourth LED channel that emits a fourth spectrum comprising white light and ii) a fifth LED channel that emits a fifth spectrum comprising biologically-tailored light having a fourth wavelength peak in a range from 650 nm to 670 nm and a fifth wavelength peak in a range from 480 nm to 500 nm. In some embodiments, the dimming profile implements the fully dimmed setting according to a time of day. In some embodiments, at the maximum current, a combined spectrum from the first spectrum, the second spectrum and the third spectrum is tailored to have chromaticity coordinates within the ANSI 3000 K to 6500 K Bin to an International Commission on Illumination (CIE) 1964 10-degree Standard Observer.

In some embodiments, a lighting control system includes a lighting fixture, a single dimmer control and a microprocessor. The lighting fixture includes a first LED channel that emits a first spectrum comprising white light and a second LED channel that emits a second spectrum comprising a wavelength peak in a range from 370 nm to 410 nm. The single dimmer control enables a user to adjust a total current to the lighting fixture. The microprocessor is configured to a) take measurements of a first current through the first LED channel and a second current through the second LED channel, where a sum of the first current and the second current is the total current; b) set a setpoint based on a plurality of average values of the total current, where the setpoint defines a maximum current for a dimming profile of the lighting fixture; and c) control an OPN5/OPN4 ratio according to the dimming profile. The dimming profile correlates the OPN5/OPN4 ratio to a percentage of the maximum current, where the OPN5/OPN4 ratio is a ratio of an OPN5 lux to a melanopic lux, and where a minimum OPN5/OPN4 ratio is output when the total current is equal to or greater than the setpoint. In some embodiments, a melanopic to photopic ratio (M/P ratio) is changed according to the dimming profile by adjusting a first proportion of the total current to the first LED channel and a second proportion of the total current to the second LED channel. In some embodiments, the microprocessor is configured to set the setpoint by decreasing the setpoint when a largest of the plurality of average values over a first time interval is less than an existing setpoint, and increasing the setpoint when the largest of the plurality of average values over a second time interval is greater than the existing setpoint, where the second time interval is less than the first time interval. For example, the first time interval may be from 24 to 26 hours and the second time interval may be from 1 to 4 hours. In some embodiments, the first spectrum and the second spectrum are all emitted in an upward direction away from the ground.

Reference has been made to embodiments of the disclosed invention. Each example has been provided by way of explanation of the present technology, not as a limitation of the present technology. In fact, while the specification has been described in detail with respect to specific embodiments of the invention, it will be appreciated that those skilled in the art, upon attaining an understanding of the foregoing, may readily conceive of alterations to, variations of, and equivalents to these embodiments. For instance, features illustrated or described as part of one embodiment may be used with another embodiment to yield a still further embodiment. Thus, it is intended that the present subject matter covers all such modifications and variations within the scope of the appended claims and their equivalents. These and other modifications and variations to the present invention may be practiced by those of ordinary skill in the art, without departing from the scope of the present invention, which is more particularly set forth in the appended claims. Furthermore, those of ordinary skill in the art will appreciate that the foregoing description is by way of example only, and is not intended to limit the invention.

What is claimed is:

1. A lighting control system comprising:
   a lighting fixture comprising:
   a first LED channel that emits a first spectrum comprising white light; and
   a second LED channel that emits a second spectrum comprising biologically-tailored light having a first wavelength peak in a range from 650 nm to 670 nm and a second wavelength peak in a range from 480 nm to 500 nm;
   a single dimmer control that enables a user to adjust a total current to the lighting fixture; and
   a microprocessor configured to:
   take measurements of a first current through the first LED channel and a second current through the second LED channel, wherein a sum of the first current and the second current is the total current;
   store a plurality of smallest average values of the total current, each of the smallest average values being calculated from the measurements over a plurality of sampling periods;
   set a setpoint based on a largest of the plurality of smallest average values, wherein the setpoint defines a maximum current for a dimming profile of the lighting fixture; and
   control a melanopic to photopic ratio (M/P ratio) according to the dimming profile, wherein the dimming profile correlates the M/P ratio to a percentage of the maximum current, and wherein the M/P ratio is a ratio of a melanopic lux to a photopic lux;
   wherein a maximum M/P ratio is output when the total current is equal to or greater than the setpoint.

2. The lighting control system of claim 1 wherein the M/P ratio is changed by adjusting a first proportion of the total current to the first LED channel and a second proportion of the total current to the second LED channel.

3. The lighting control system of claim 1 wherein the microprocessor is configured to set the setpoint by:
   decreasing the setpoint when the largest of the plurality of smallest average values over a first time interval is less than an existing setpoint; and
   increasing the setpoint when the largest of the plurality of smallest average values over a second time interval is greater than the existing setpoint;
   wherein the second time interval is less than the first time interval.

4. The lighting control system of claim 3 wherein the first time interval is from 24 to 26 hours and the second time interval is from 1 to 4 hours.

5. The lighting control system of claim 1 wherein the lighting fixture further comprises a third LED channel that emits a third spectrum having a third wavelength peak in a range from 370 nm to 410 nm.

6. The lighting control system of claim 5 wherein the first spectrum, the second spectrum and the third spectrum are all emitted in a downward direction toward the ground.

7. The lighting control system of claim 5 wherein the dimming profile has a fully dimmed setting in which the third wavelength peak is a maximum wavelength peak emitted by the lighting fixture.

8. The lighting control system of claim 5 wherein as the total current is reduced, the dimming profile increases a proportion of the total current that is delivered to the third wavelength peak.

9. The lighting control system of claim 1 wherein a second proportion of the total current to the second LED channel is decreased at a higher rate than a first proportion of the total current to the first LED channel when the total current is between 50% to 100% of the setpoint.

10. The lighting control system of claim 9 wherein the second proportion is decreased at twice a rate as the first proportion.

11. The lighting control system of claim 1 wherein the plurality of smallest average values and the setpoint are saved in a non-volatile memory.

12. The lighting control system of claim 1 wherein the first wavelength peak and the second wavelength peak of the second spectrum are present at the maximum current of the dimming profile.

13. A lighting control system comprising:
a lighting fixture comprising:
a first LED channel that emits a first spectrum comprising white light;
a second LED channel that emits a second spectrum comprising biologically-tailored light having a first wavelength peak in a range from 650 nm to 670 nm and a second wavelength peak in a range from 480 nm to 500 nm; and
a third LED channel that emits a third spectrum having a third wavelength peak in a range from 370 nm to 410 nm;
a single dimmer control that enables a user to adjust a total current to the lighting fixture; and
a microprocessor configured to:
take measurements of a first current through the first LED channel, a second current through the second LED channel and a third current through the third LED channel, wherein a sum of the first current and the second current and the third current is the total current;
set a setpoint based on a plurality of average values of the total current, wherein the setpoint defines a maximum current for a dimming profile of the lighting fixture; and
control a violet to melanopic ratio (OPN5/OPN4 ratio) ratio according to the dimming profile, wherein the dimming profile correlates the OPN5/OPN4 ratio to a percentage of the maximum current, and wherein the OPN5/OPN4 ratio is a ratio of an OPN5 lux to a melanopic lux;
wherein a minimum OPN5/OPN4 ratio is output when the total current is equal to or greater than the setpoint.

14. The lighting control system of claim 13 wherein the white light has a color correlated temperature that is in the range from 8000 K to 20,000 K.

15. The lighting control system of claim 13 wherein the white light has a color correlated temperature that is in the range from 2700 K to 4000 K.

16. The lighting control system of claim 13 wherein the first spectrum, the second spectrum and the third spectrum are all emitted in a downward direction toward the ground.

17. The lighting control system of claim 13 wherein the first spectrum, the second spectrum and the third spectrum are all emitted in an upward direction away from the ground.

18. The lighting control system of claim 17 further comprising a second lighting fixture that emits light in a downward direction toward the ground, the second lighting fixture comprising:
a fourth LED channel that emits a fourth spectrum comprising white light; and
a fifth LED channel that emits a fifth spectrum comprising a fourth wavelength peak in a range from 650 nm to 670 nm and a fifth wavelength peak in a range from 480 nm to 500 nm.

19. The lighting control system of claim 13 wherein the dimming profile implements the fully dimmed setting according to a time of day.

20. The lighting control system of claim 13 wherein at the maximum current, a combined spectrum from the first spectrum, the second spectrum and the third spectrum is tailored to have chromaticity coordinates within an ANSI 3000 K to 6500 K Bin to an International Commission on Illumination (CIE) 1964 10-degree Standard Observer.

21. The lighting control system of claim 13 wherein the microprocessor is further configured to:
store the plurality of average values, each of the average values being a smallest average value over a sampling period; and
set the setpoint: i) based on a largest of the plurality of average values over a time interval, ii) by decreasing the setpoint when the plurality of average values over a first time interval is lower than an existing setpoint, and iii) by increasing the setpoint when the plurality of average values of the total current over a second time interval is greater than the existing setpoint;
wherein the second time interval is less than the first time interval.

22. A lighting control system comprising:
a lighting fixture comprising:
a first LED channel that emits a first spectrum comprising white light; and
a second LED channel that emits a second spectrum comprising a wavelength peak in a range from 370 nm to 410 nm;
a single dimmer control that enables a user to adjust a total current to the lighting fixture; and
a microprocessor configured to:
take measurements of a first current through the first LED channel and a second current through the second LED channel, wherein a sum of the first current and the second current is the total current;
set a setpoint based on a plurality of average values of the total current, wherein the setpoint defines a maximum current for a dimming profile of the lighting fixture; and
control a violet to melanopic ratio (OPN5/OPN4 ratio) according to the dimming profile, wherein the dimming profile correlates the OPN5/OPN4 ratio to a percentage of the maximum current, and wherein the OPN5/OPN4 ratio is a ratio of an OPN5 lux to a melanopic lux;
wherein a minimum OPN5/OPN4 ratio is output when the total current is equal to or greater than the setpoint.

23. The lighting control system of claim 22 wherein a melanopic to photopic ratio (M/P ratio) is changed according to the dimming profile by adjusting a first proportion of the total current to the first LED channel and a second proportion of the total current to the second LED channel.

24. The lighting control system of claim 22 wherein the microprocessor is configured to set the setpoint by:
- decreasing the setpoint when a largest of the plurality of average values over a first time interval is less than an existing setpoint; and
- increasing the setpoint when the largest of the plurality of average values over a second time interval is greater than the existing setpoint;
- wherein the second time interval is less than the first time interval.

25. The lighting control system of claim 24 wherein the first time interval is from 24 to 26 hours and the second time interval is from 1 to 4 hours.

26. The lighting control system of claim 22 wherein the first spectrum and the second spectrum are all emitted in an upward direction away from the ground.

\* \* \* \* \*